(12) United States Patent
Jerrim

(10) Patent No.: US 10,547,674 B2
(45) Date of Patent: Jan. 28, 2020

(54) METHODS AND SYSTEMS FOR NETWORK FLOW ANALYSIS

(71) Applicant: DAMBALLA, INC., Atlanta, GA (US)

(72) Inventor: John Jerrim, Gainesville, GA (US)

(73) Assignee: Help/Systems, LLC, Eden Prairie, MN (US)

( * ) Notice: Subject to any disclaimer, the term of this patent is extended or adjusted under 35 U.S.C. 154(b) by 97 days.

(21) Appl. No.: 14/010,016

(22) Filed: Aug. 26, 2013

(65) Prior Publication Data

US 2014/0059216 A1 Feb. 27, 2014

Related U.S. Application Data

(60) Provisional application No. 61/693,607, filed on Aug. 27, 2012.

(51) Int. Cl.
*G06F 15/173* (2006.01)
*H04L 29/08* (2006.01)

(52) U.S. Cl.
CPC ................... *H04L 67/104* (2013.01)

(58) Field of Classification Search
CPC ................... H04L 41/0893; H04L 67/104
See application file for complete search history.

(56) References Cited

U.S. PATENT DOCUMENTS

| 4,843,540 | A | 6/1989 | Stolfo |
| 4,860,201 | A | 8/1989 | Stolfo et al. |
| 5,363,473 | A | 11/1994 | Stolfo et al. |
| 5,497,486 | A | 3/1996 | Stolfo et al. |
| 5,563,783 | A | 10/1996 | Stolfo et al. |
| 5,668,897 | A | 9/1997 | Stolfo |
| 5,717,915 | A | 2/1998 | Stolfo et al. |
| 5,748,780 | A | 5/1998 | Stolfo |
| 5,920,848 | A | 7/1999 | Schultzer et al. |
| 6,401,118 | B1 | 6/2002 | Thomas |
| 6,738,908 | B1 | 5/2004 | Bonn et al. |
| 6,983,320 | B1 | 1/2006 | Thomas et al. |
| 7,013,323 | B1 | 3/2006 | Thomas et al. |
| 7,039,721 | B1 | 5/2006 | Wu et al. |
| 7,043,759 | B2 | 5/2006 | Kaaschoek et al. |
| 7,069,249 | B2 | 6/2006 | Stolfo et al. |
| 7,093,292 | B1 | 8/2006 | Pantuso |

(Continued)

FOREIGN PATENT DOCUMENTS

| WO | WO 02/37730 | 5/2002 |
| WO | WO 02/098100 | 12/2002 |
| WO | WO 2007/050244 | 5/2007 |

OTHER PUBLICATIONS

File History of U.S. Appl. No. 11/538,212.

(Continued)

*Primary Examiner* — Brian Whipple
*Assistant Examiner* — Anthony T Rotolo
(74) *Attorney, Agent, or Firm* — Fredrikson & Byron P.A.

(57) ABSTRACT

A system and method comprising: receiving network flow data; identifying a peer to peer network flow within the network flow data comparing the peer to peer network flow to a known peer to peer application flow; labeling the peer to peer network flow as the known peer to peer application flow when the peer to peer network flow matches the known peer to peer application flow; and creating a data set to be associated with the labeled peer to flow.

22 Claims, 6 Drawing Sheets

(56) References Cited

U.S. PATENT DOCUMENTS

| | | |
|---|---|---|
| 7,136,932 B1 | 11/2006 | Schneider |
| 7,152,242 B2 | 12/2006 | Douglas |
| 7,162,741 B2 | 1/2007 | Eskin et al. |
| 7,185,368 B2 | 2/2007 | Copeland, III |
| 7,203,959 B2 | 4/2007 | Nachenberg et al. |
| 7,225,343 B1 | 5/2007 | Honig et al. |
| 7,277,961 B1 | 10/2007 | Smith et al. |
| 7,278,163 B2 | 10/2007 | Banzhof |
| 7,290,283 B2 | 10/2007 | Copeland, III |
| 7,331,060 B1 | 2/2008 | Ricciulli |
| 7,372,809 B2 | 5/2008 | Chen et al. |
| 7,383,577 B2 | 6/2008 | Hrastar et al. |
| 7,424,619 B1 | 9/2008 | Fan et al. |
| 7,426,576 B1 | 9/2008 | Banga et al. |
| 7,448,084 B1 | 11/2008 | Apap et al. |
| 7,475,426 B2 | 1/2009 | Copeland, III |
| 7,483,947 B2 | 1/2009 | Starbuck |
| 7,549,169 B1 | 1/2009 | Sobel et al. |
| 7,487,544 B2 | 2/2009 | Schultz et al. |
| 7,512,980 B2 | 3/2009 | Copeland et al. |
| 7,519,818 B2 | 4/2009 | Levin et al. |
| 7,519,994 B2 | 4/2009 | Judge et al. |
| 7,536,360 B2 | 5/2009 | Stolfo et al. |
| 7,634,808 B1 | 12/2009 | Szor |
| 7,639,714 B2 | 12/2009 | Stolfo et al. |
| 7,644,151 B2 | 1/2010 | Jerrim et al. |
| 7,657,935 B2 | 2/2010 | Stolfo et al. |
| 7,665,131 B2 | 2/2010 | Goodman |
| 7,698,442 B1 | 4/2010 | Krishnamurthy |
| 7,712,134 B1 | 5/2010 | Nucci et al. |
| 7,752,125 B1 | 7/2010 | Kothari et al. |
| 7,752,665 B1 | 7/2010 | Robertson et al. |
| 7,779,463 B2 | 8/2010 | Stolfo et al. |
| 7,784,097 B1 | 8/2010 | Stolfo et al. |
| 7,818,797 B1 | 10/2010 | Fan et al. |
| 7,882,542 B2 | 2/2011 | Neystadt |
| 7,886,358 B2 | 2/2011 | Copeland, III |
| 7,890,627 B1 | 2/2011 | Thomas |
| 7,895,326 B2 | 2/2011 | Jerrim et al. |
| 7,913,306 B2 | 3/2011 | Apap et al. |
| 7,930,353 B2 | 4/2011 | Chickering |
| 7,962,798 B2 | 6/2011 | Locasto et al. |
| 7,979,907 B2 | 7/2011 | Schultz et al. |
| 7,996,288 B1 | 8/2011 | Stolfo |
| 8,015,414 B2 | 9/2011 | Mahone |
| 8,019,764 B1 | 9/2011 | Nucci |
| 8,065,722 B2 | 11/2011 | Barford et al. |
| 8,074,115 B2 | 12/2011 | Stolfo et al. |
| 8,161,130 B2 | 4/2012 | Stokes |
| 8,170,966 B1 | 5/2012 | Musat et al. |
| 8,180,916 B1* | 5/2012 | Nucci ............... H04L 43/028 709/223 |
| 8,200,761 B1 | 6/2012 | Tevanian |
| 8,224,994 B1 | 7/2012 | Schneider |
| 8,260,914 B1 | 9/2012 | Ranjan |
| 8,341,745 B1 | 12/2012 | Chau |
| 8,347,394 B1 | 1/2013 | Lee |
| 8,402,543 B1 | 3/2013 | Ranjan et al. |
| 8,418,249 B1 | 4/2013 | Nucci et al. |
| 8,484,377 B1 | 7/2013 | Chen et al. |
| 8,516,585 B2 | 8/2013 | Cao et al. |
| 8,527,592 B2 | 9/2013 | Gabe |
| 8,578,497 B2 | 11/2013 | Antonakakis et al. |
| 8,631,489 B2 | 1/2014 | Antonakakis et al. |
| 8,667,583 B2 | 3/2014 | Polyakov et al. |
| 8,826,438 B2 | 9/2014 | Perdisci et al. |
| 8,832,829 B2 | 9/2014 | Manni et al. |
| 8,869,269 B1 | 10/2014 | Ramzan et al. |
| 9,306,969 B2 | 4/2016 | Dagon et al. |
| 9,516,058 B2 | 12/2016 | Antonakakis et al. |
| 9,525,699 B2 | 12/2016 | Antonakakis et al. |
| 9,571,511 B2 | 2/2017 | Nelms et al. |
| 2001/0014093 A1 | 8/2001 | Yoda et al. |
| 2001/0044785 A1 | 11/2001 | Stolfo et al. |
| 2001/0052007 A1 | 12/2001 | Shigezumi |
| 2001/0052016 A1 | 12/2001 | Skene et al. |
| 2001/0055299 A1 | 12/2001 | Kelly |
| 2002/0021703 A1 | 2/2002 | Tsuchiya et al. |
| 2002/0066034 A1 | 5/2002 | Schlossberg et al. |
| 2002/0166063 A1 | 11/2002 | Lachman et al. |
| 2002/0178238 A1 | 11/2002 | Fletcher et al. |
| 2003/0065926 A1 | 4/2003 | Schultz et al. |
| 2003/0065943 A1 | 4/2003 | Geis et al. |
| 2003/0069992 A1 | 4/2003 | Ramig |
| 2003/0145233 A1 | 7/2003 | Poletto et al. |
| 2003/0167308 A1 | 9/2003 | Schran |
| 2003/0167402 A1 | 9/2003 | Stolfo et al. |
| 2003/0204621 A1 | 10/2003 | Poletto et al. |
| 2003/0236995 A1 | 12/2003 | Fretwell, Jr. |
| 2004/0002903 A1 | 1/2004 | Stolfo et al. |
| 2004/0039798 A1 | 2/2004 | Hotz et al. |
| 2004/0044791 A1 | 3/2004 | Pouzzner |
| 2004/0088346 A1 | 5/2004 | Yeager |
| 2004/0088348 A1* | 5/2004 | Yeager ............... H04L 67/104 709/202 |
| 2004/0111636 A1 | 6/2004 | Baffes et al. |
| 2004/0181687 A1 | 9/2004 | Nachenberg et al. |
| 2004/0187032 A1 | 9/2004 | Gels et al. |
| 2004/0205474 A1 | 10/2004 | Eskin et al. |
| 2004/0215972 A1 | 10/2004 | Sung et al. |
| 2005/0021848 A1 | 1/2005 | Jorgenson |
| 2005/0036501 A1 | 2/2005 | Chung et al. |
| 2005/0039019 A1 | 2/2005 | Delany |
| 2005/0044406 A1 | 2/2005 | Stute |
| 2005/0050377 A1 | 3/2005 | Chan et al. |
| 2005/0060643 A1* | 3/2005 | Glass ............... G06F 17/241 715/205 |
| 2005/0086523 A1 | 4/2005 | Zimmer et al. |
| 2005/0108407 A1 | 5/2005 | Johnson et al. |
| 2005/0108415 A1 | 5/2005 | Turk et al. |
| 2005/0210534 A1 | 9/2005 | Krishnamurthy |
| 2005/0257264 A1 | 11/2005 | Stolfo et al. |
| 2005/0261943 A1 | 11/2005 | Quarterman et al. |
| 2005/0265331 A1 | 12/2005 | Stolfo |
| 2005/0278540 A1 | 12/2005 | Cho |
| 2005/0281291 A1 | 12/2005 | Stolfo et al. |
| 2006/0015630 A1 | 1/2006 | Stolfo et al. |
| 2006/0015722 A1 | 1/2006 | Rowan et al. |
| 2006/0026682 A1 | 2/2006 | Zakas |
| 2006/0031483 A1 | 2/2006 | Lund |
| 2006/0067240 A1 | 3/2006 | Kim et al. |
| 2006/0068806 A1* | 3/2006 | Nam ............... H04L 63/1408 455/452.2 |
| 2006/0075084 A1 | 4/2006 | Lyon |
| 2006/0075494 A1 | 4/2006 | Bertman et al. |
| 2006/0078096 A1 | 4/2006 | Poyhonen |
| 2006/0143711 A1 | 6/2006 | Huang et al. |
| 2006/0146816 A1 | 7/2006 | Jain |
| 2006/0150249 A1 | 7/2006 | Gassen et al. |
| 2006/0156402 A1 | 7/2006 | Stone et al. |
| 2006/0168024 A1 | 7/2006 | Mehr |
| 2006/0174345 A1 | 8/2006 | Flanagan et al. |
| 2006/0176822 A1 | 8/2006 | Doyle et al. |
| 2006/0178994 A1 | 8/2006 | Stolfo et al. |
| 2006/0200539 A1 | 9/2006 | Kappler et al. |
| 2006/0212925 A1 | 9/2006 | Shull et al. |
| 2006/0212942 A1 | 9/2006 | Barford et al. |
| 2006/0224677 A1 | 10/2006 | Ishikawa et al. |
| 2006/0230039 A1 | 10/2006 | Shull |
| 2006/0247982 A1 | 11/2006 | Stolfo et al. |
| 2006/0253581 A1 | 11/2006 | Dixon |
| 2006/0253584 A1 | 11/2006 | Dixon |
| 2006/0259967 A1 | 11/2006 | Thomas et al. |
| 2006/0265436 A1* | 11/2006 | Edmond ........... G06F 17/30017 |
| 2006/0288415 A1 | 12/2006 | Wong |
| 2007/0050708 A1 | 3/2007 | Gupta et al. |
| 2007/0056038 A1 | 3/2007 | Lok |
| 2007/0064617 A1 | 3/2007 | Reves |
| 2007/0076606 A1* | 4/2007 | Olesinski ........... H04L 41/0893 370/230 |
| 2007/0083931 A1 | 4/2007 | Spiegel |
| 2007/0118669 A1 | 5/2007 | Rand et al. |
| 2007/0136455 A1 | 6/2007 | Lee et al. |
| 2007/0162587 A1 | 7/2007 | Lund et al. |

(56) References Cited

U.S. PATENT DOCUMENTS

| | | |
|---|---|---|
| 2007/0198679 A1 | 8/2007 | Duyanovich et al. |
| 2007/0209074 A1 | 9/2007 | Coffman |
| 2007/0239999 A1 | 10/2007 | Honig et al. |
| 2007/0253377 A1 | 11/2007 | Janneteau et al. |
| 2007/0274312 A1 | 11/2007 | Salmela et al. |
| 2007/0294339 A1 | 12/2007 | Ala-Kleemola et al. |
| 2007/0294419 A1 | 12/2007 | Ulevitch |
| 2008/0005555 A1 | 1/2008 | Lotem et al. |
| 2008/0016570 A1 | 1/2008 | Capalik |
| 2008/0028073 A1 | 1/2008 | Trabe et al. |
| 2008/0028463 A1 | 1/2008 | Dagon |
| 2008/0060054 A1 | 3/2008 | Srivastava |
| 2008/0060071 A1 | 3/2008 | Hennan |
| 2008/0098476 A1 | 4/2008 | Syversen |
| 2008/0133300 A1 | 6/2008 | Jalinous |
| 2008/0155694 A1 | 6/2008 | Kwon et al. |
| 2008/0177736 A1 | 7/2008 | Spangler |
| 2008/0177755 A1 | 7/2008 | Stern et al. |
| 2008/0178293 A1 | 7/2008 | Keen et al. |
| 2008/0184371 A1 | 7/2008 | Moskovitch |
| 2008/0195369 A1 | 8/2008 | Duyanovich et al. |
| 2008/0222729 A1 | 9/2008 | Chen et al. |
| 2008/0229415 A1 | 9/2008 | Kapoor |
| 2008/0262985 A1 | 10/2008 | Cretu et al. |
| 2008/0263659 A1 | 10/2008 | Alme |
| 2008/0276111 A1 | 11/2008 | Jocoby et al. |
| 2009/0055929 A1 | 2/2009 | Lee et al. |
| 2009/0083855 A1 | 3/2009 | Apap et al. |
| 2009/0106304 A1 | 4/2009 | Song |
| 2009/0138590 A1 | 5/2009 | Lee et al. |
| 2009/0171871 A1 | 7/2009 | Zhang et al. |
| 2009/0193293 A1 | 7/2009 | Stolfo et al. |
| 2009/0193497 A1 | 7/2009 | Kikuchi et al. |
| 2009/0198997 A1 | 8/2009 | Yeap |
| 2009/0210417 A1 | 8/2009 | Bennett |
| 2009/0222922 A1 | 9/2009 | Sidiroglou et al. |
| 2009/0241190 A1 | 9/2009 | Todd et al. |
| 2009/0241191 A1 | 9/2009 | Keromytis et al. |
| 2009/0254658 A1 | 10/2009 | Kamikura et al. |
| 2009/0254989 A1 | 10/2009 | Achan et al. |
| 2009/0254992 A1 | 10/2009 | Schultz et al. |
| 2009/0265777 A1 | 10/2009 | Scott |
| 2009/0282479 A1 | 11/2009 | Smith et al. |
| 2009/0327487 A1 | 12/2009 | Olson et al. |
| 2010/0011243 A1 | 1/2010 | Locasto et al. |
| 2010/0011420 A1 | 1/2010 | Drako |
| 2010/0017487 A1 | 1/2010 | Patinkin |
| 2010/0023810 A1 | 1/2010 | Stolfo et al. |
| 2010/0031358 A1 | 2/2010 | Elovici et al. |
| 2010/0034109 A1 | 2/2010 | Shomura et al. |
| 2010/0037314 A1 | 2/2010 | Perdisci et al. |
| 2010/0043047 A1 | 2/2010 | Archer et al. |
| 2010/0054278 A1 | 3/2010 | Stolfo et al. |
| 2010/0064368 A1 | 3/2010 | Stolfo et al. |
| 2010/0064369 A1 | 3/2010 | Stolfo et al. |
| 2010/0071068 A1* | 3/2010 | Bauschert ............... G06F 21/10 726/26 |
| 2010/0074112 A1 | 3/2010 | Derr et al. |
| 2010/0077481 A1 | 3/2010 | Polyakov et al. |
| 2010/0077483 A1 | 3/2010 | Stolfo et al. |
| 2010/0082758 A1 | 4/2010 | Golan |
| 2010/0138919 A1 | 6/2010 | Peng |
| 2010/0146615 A1 | 6/2010 | Locasto et al. |
| 2010/0153785 A1 | 6/2010 | Keromytis et al. |
| 2010/0169970 A1 | 7/2010 | Stolfo et al. |
| 2010/0235915 A1 | 9/2010 | Memon et al. |
| 2010/0269175 A1 | 10/2010 | Stolfo et al. |
| 2010/0274970 A1 | 10/2010 | Treuhaft et al. |
| 2010/0275263 A1 | 10/2010 | Bennett et al. |
| 2010/0281539 A1 | 11/2010 | Burns et al. |
| 2010/0281541 A1 | 11/2010 | Stolfo et al. |
| 2010/0281542 A1 | 11/2010 | Stolfo et al. |
| 2010/0319069 A1 | 12/2010 | Granstedt |
| 2010/0332680 A1 | 12/2010 | Anderson et al. |
| 2011/0040706 A1* | 2/2011 | Sen ....................... G06N 99/005 706/12 |
| 2011/0041179 A1 | 2/2011 | Stahlberg |
| 2011/0055123 A1 | 3/2011 | Kennedy |
| 2011/0067106 A1 | 3/2011 | Evans et al. |
| 2011/0167493 A1 | 7/2011 | Song et al. |
| 2011/0167494 A1 | 7/2011 | Bowen et al. |
| 2011/0185423 A1 | 7/2011 | Sallam |
| 2011/0185428 A1 | 7/2011 | Sallam |
| 2011/0214161 A1 | 9/2011 | Stolfo et al. |
| 2011/0225644 A1 | 9/2011 | Pullikottil et al. |
| 2011/0283361 A1 | 11/2011 | Perdisci et al. |
| 2012/0079101 A1* | 3/2012 | Muppala ............. H04L 47/2441 709/224 |
| 2012/0084860 A1 | 4/2012 | Cao et al. |
| 2012/0102568 A1 | 4/2012 | Tarbotton et al. |
| 2012/0117641 A1 | 5/2012 | Holloway |
| 2012/0143650 A1 | 6/2012 | Crowley et al. |
| 2012/0151585 A1 | 6/2012 | Lamastra et al. |
| 2012/0198549 A1 | 8/2012 | Antonakakis et al. |
| 2012/0215909 A1* | 8/2012 | Goldfarb ............... H04L 43/026 709/224 |
| 2013/0054802 A1* | 2/2013 | Donzis ............... G06F 17/30887 709/225 |
| 2013/0174253 A1 | 7/2013 | Thomas et al. |
| 2013/0191915 A1 | 7/2013 | Antonakakis et al. |
| 2013/0232574 A1 | 9/2013 | Carothers |
| 2014/0068763 A1 | 3/2014 | Ward et al. |
| 2014/0068775 A1 | 3/2014 | Ward et al. |
| 2014/0074838 A1 | 3/2014 | Akoglu et al. |
| 2014/0075558 A1 | 3/2014 | Ward et al. |
| 2014/0090058 A1 | 3/2014 | Ward et al. |
| 2014/0157414 A1 | 6/2014 | Antonakakis et al. |
| 2014/0289854 A1 | 9/2014 | Mahvi |
| 2015/0026808 A1 | 1/2015 | Perdisci et al. |
| 2015/0222654 A1 | 8/2015 | Crowley et al. |
| 2016/0156660 A1 | 6/2016 | Dagon et al. |
| 2016/0285894 A1 | 9/2016 | Nelms et al. |

OTHER PUBLICATIONS

File History of U.S. Appl. No. 12/985,140.

File History of U.S. Appl. No. 13/008,257.

File History of U.S. Appl. No. 13/358,303.

Cliff Changchun Zou et al., "Code Red Worm Propagation Modeling and Analysis", In Proceedings of 9th ACM Conference on Computer and Communications Security (CCS '02), Nov. 18, 2002.

Cliff C. Zou et al,. "Email Worm Modeling and Defense", In the 13th ACM International Confrerence on Computer Communications and Networks (CCCN '04), Oct. 27, 2004.

Cliff Changchun Zou et al., "Monitoring and Early Warning for Internet Worms", In Proceedings fo the 10th ACM Conference on Computer and Communications Security (CCS '03), Oct. 2003.

Cliff Changchun Zou et al., "On the Performance of Internet Worm Scanning Strategies", Technical Report TR-03-CSE-07, Umass ECE Dept., Nov. 2003.

Alexander Gostev, "Malware Elovution: Jan.-Mar. 2005", Viruslist. com, http://www.viruslist.com/en/analysis?pubid=162454316, (Apr. 18, 2005).

Jiang Wu et al., "An Effective Architecture and Algorithm for Detecting Worms with Various Scan Techniques", In Proceedings of the 11th Annual Network and Distributed System Security Symposium (NDSS '04), Feb. 2004.

Matthew M. Williamson et al., "Virus Throttling for Instant Messaging", Virus Bulletin Conference, Sep. 2004, Chicago, IL, USA, (Sep. 2004).

F. Weimer, "Passive DNS Replication", http://www.enyo.de/fw/software/dnslogger, 2005.

Ke Wang et al., "Anomalous Payload-Based Network Intrusion Detection", In Proceedings of the 7th International Symposium on Recent Advances in Intrusion Detection (RAID 2004), 2004.

P. Vixie et al,. "RFC 2136: Dynamic Updates in the Domain Name System (DNS Update)", http://www.faqs.org/rfcs.rfc2136.html (Apr. 1997).

(56) References Cited

OTHER PUBLICATIONS

Joe Stewart, "Dipnet/Oddbob Worm Analysis", SecureWorks, http://www.secureworks.com/research/threats/dipnet/ (Jan. 13, 2005).
Harold Thimbleby et al., "A Framework for Modeling Trojans and Computer Virus Infection", Computer Journal, vol. 41, No. 7, pp. 444-458 (1999).
Paul Bachner et al., "Know Your Enemy: Tracking Botnets", http://www.honeynet.org/papers/bots/, (Mar. 13, 2005).
"LockDown Security Bulletin—Sep. 23, 2001", http://lockdowncorp.com/bots/ (Sep. 23, 2001).
Colleen Shannon et al., "The Spread of the Witty Worm", http://www.caida.org/analysis/security/witty/index.xml (Mar. 19, 2004).
Moheeb Abu Rajab et al., "On the Effectiveness of Distributed Worm Monitoring", In Proceedings fo the 14th USENIX Security Symposium (2005).
Niels Provos, "CITI Technical Report 03-1: A Virtual Honeypot Framework", http://www.citi.umich.edu/techreports/reports/citi-tr-03-1.pdf (Oct. 21, 2003).
"Know your Enemy: Honeynets", http://www.honeypot.org/papers/honeynet, (May 31, 2006).
David Moore et al., "Internet Quarantine: Requirements for Containing Self-Propagating Code", In Proceedings of the IEEE INFOCOM 2003, Mar. 2003.
Joe Stewart, "I-Worm Baba Analysis", http://secureworks.com/research/threats/baba (Oct. 22, 2004.
David Moore et al., "Slammer Worm Dissection: Inside the Slammer Worm", IEEE Security & Privacy, vol. 1, No. 4 (Jul.-Aug. 2003).
David Moore et al., "Code-Red: A Case Study on the Spread and Victims of an Internet Worm", http://www.icir.org/vern/imw-2002/imw2002-papers/209.ps/gz (2002).
Joe Stewart, "Sinit P2P Trojan Analysis", http://www.secureworks.com/research/threats/sinit, (Dec. 8, 2003).
Martin Krzywinski, "Port Knocking—Network Authentication Across Closed Ports", Sys Admin Magazine, vol. 12, pp. 12-17 (2003).
Christopher Kruegel et al., "Anomaly Detection of Web-Based Attacks", In Proceedings of the 10th ACM Conference on Computer and Communication Security (CCS '03), Oct. 27-31, 2003, Washington, DC, USA, pp. 251-261.
"Dabber Worm Analysis", LURHQ Threat Intelligence Group, http://www.lurhq.com/dabber.html (May 13, 2004).
Abstract of Jeffrey O. Kephart et al,. "Directed-Graph Epidemiological Models of Computer Viruses", Proceedings of the 1991 IEEE Computer Society Symposium on Research in Security and Privacy; Oakland, CA, May 20-22, 1991; pp. 343-359 (May 20-22, 1991).
C. Kalt "RFC 2810—Internet Relay Chat: Architecture" http://faqs.org/rfcs/rfc2810.html (Apr. 2000).
Xuxian Jiang et al., "Cerias Tech Report 2005-24: Virtual Playgrounds for Worm Behavior Investigation", Purdue University, Feb. 2005.
Neal Hindocha et al., "Malicious Threats and Vulnerabilities in Instant Messaging", Virus Bulletin International Conference, Sep. 2003.
Thomer M. Gil, "NSTX (IP-over-DNS) HOWTO", http://thomer.com/howtos/nstx.html, Nov. 4, 2005 (5 pages).
V. Fuller et al., "RFC 1519—Classless Inter-Domain Routing (CIDR): An Address Assignment and Aggregation Strategy", http://www.faqs.org/rfcs/rfc1519.html (Sep. 1993).
David E. Smith "Dynamic DNS", http://www.technopagan.org/dynamic (Aug. 7, 2006).
Dave Dittrich, "Active Response Continuum Research Project", http://staff.washington.edu/dittrich/arc/ (Nov. 14, 2005).
Joe Stewart, "Akak Trojan Analysis", http://www.secureworks.com/research/threats/akak/ (Aug. 31, 2004).
Monirul I. Sharif, "Mechanisms of Dynamic Analysis and DSTRACE".
Kapil Kumar Singh, "IRC Reconnaissance (IRCRecon) Public IRC Heuristics (BotSniffer)" (Jul. 24, 2006).
http://www.trendmicro.com/en/home/us/home.htm.

"InterCloud Security Service", http://ww.trendmicro.com/en/products/nss/icss/evaluate/overview.thm.
"2006 Press Releases: Trend Micro Takes Unprecedented Approach to Eliminating Botnet Threats with the Unveiling of InterCloud Security Service", http://www.trendmicro.com/en/about/news/pr/archive/2006/pr092506.htm, (Sep. 25, 2006).
Paul F. Roberts, "Trend Micro Launches Anti-Botnet Service", InfoWorld, http://www.infoworld.com/article/06/09/25/HNtrendintercloud_1.html (Sep. 25, 2006).
CNN Technology News—Expert: Botnets No. 1 Emerging Internet Threat, CNN.com, http://www.cnn.com/2006/TECH/internet/01/31/furst.index.html (Jan. 31, 2006).
Evan Cooke et al., "The Zombie Roundup: Understanding, Detecting, and Disrupting Botnets", In USENIX Workshop on Steps to Reducing Unwanted Traffic on the Internet (SRUTI), Jun. 2005.
Sven Dietrich et al., "Analyzing Distributed Denial of Service Tools: The Shaft Case", Proceedings of the 14th Systems Administration Conference (LISA 2000), New Orleans, Louisiana, USA, Dec. 3-8, 2000.
Felix C. Freiling et al,. "Botnet Tracking: Exploring a Root-Cause Methodology to Prevent Distributed Denial-of-Service Attacks", ESORICS 2005, LNCS 3679, pp. 319-335 (2005).
Luiz Henrique Gomes et al,. "Characterizing a Spam Traffic", In Proc. ACM SIGCOMM Internet Measurement Conference (IMC '04), Oct. 25-27, 2004 Taormina, Sicily, Italy, pp. 356-369.
Christopher W. Hanna, "Using Snort to Detect Rogue IRC Bot Programs", Technical Report, SANS Institute 2004 (Oct. 8, 2004).
Jaeyeon Jung et al., "An Empirical Study of Spam Traffic and the Use of DNS Black Lists", In Proc. ACM SIGCOMM Internet Measurement Conference (IMC '04), Oct. 25-27, 2004, Taormina, Sicily, Italy, pp. 370-375.
Srikanth Kandula et al., "Botz-4-Sale: Surviving Organized DDoS Attacks That Mimic Flash Crowds", Technical Report LCS TR-969, Laboratory for Computer Science, MIT, 2004.
Sven Krasser et al., "Real-Time and Forensic Network Data Analysis Using Animated and Coordinated Visualization", Proceedings of the 6th IEEE Information Assurance Workshop (Jun. 2005).
David Moore et al., "Inferring Internet Denial-of-Service Activity", In Proceedings of the 2001 USENIX Security Symposium, 2001.
Stephane Racine, "Master's Thesis: Analysis for Internet Relay Chat Usage by DDoS Zombies", ftp://www.tik.ee.ethz.ch/pub/students/2003-2004-Wi/MA-2004-01.pdf (Nov. 3, 2003).
Anirudh Ramachandran et al., "Understanding the Network-Level Behavior of Spammers", SIGCOMM '06, Sep. 11-15, 2006, Pisa, Italy, pp. 291-302.
Ramneek Puri, "Bots & Botnet: An Overview", SANS Institute 2003, http://www.giac.com/practical/GSEC/Ramneek_Puri_GSEC.pdf (Aug. 8, 2003).
Stuart E. Schechter et al., "Access For Sale: A New Class of Worm", In 2003 ACM Workshop on Rapid Malcode (WORM '03), ACM SIGSAC, Oct. 27, 2003, Washington, DC, USA.
Stuart Staniford, "How to Own the Internet in Your Spare Time", In Proc. 11th USENIX Security Symposium, San Francisco, CA, Aug. 2002.
Martin Overton, "Bots and Botnets: Risks, Issues and Prevention", 2005 Virus Bulletin Conference at the Burlington, Dublin, Ireland, Oct. 5-7, 2005, http://arachnid.homeip.net/papers/VB2005-Bots_and_Botnets-1.0.2.pdf.
Yin Zhang et al., "Detecting Stepping Stones", Proceedings of the 9th USENIX Security Symposium, Denver, Colorado, USA, Aug. 14-17, 2000.
Joe Stewart, "Bobax Trojan Analysis", http://www.lurhq.com/bobax.html, May 17, 2004.
David Brumley et al., "Tracking Hackers on IRC", http://www.doomded.com/texts/ircmirc/TrackingHackersonIRC.htm. Dec. 8, 1999.
Brian Krebs, "Bringing Botnets Out of the Shadows", Washingtonpost.com, http://www.washingtonpost.com/wp-dyn/content/artcile/2006/03/21/AR2006032100279_pf.html, Mar. 21, 2006.
"SwatIT: Bots, Drones, Zombies, Worms and Other Things That Go Bump in the Night", http://swatit.org/bots, 2004.
Christian Kreibich, "Honeycomb: Automated NIDS Signature Creation Using Honeypots", 2003, http://www.cl.cam.ac.uk/research/srg/netos/papers/2003-honeycomb-sigcomm-poster.pdf.

(56) References Cited

OTHER PUBLICATIONS

DMOZ Open Directory Project, Dynamic DNS Providers List, http://dmoz.org/Computers/Software/Internet/Servers/Address_Management/Dynamic_DNS_Services/.
David Moore, "Network Telescopes: Observing Small or Distant Security Events", http://www.caida.org/publications/presentations/2002/usenix_sec/usenix_sec_2002_files/frame.htm; Aug. 8, 2002.
Vincent H. Berk et al., "Using Sensor Networks and Data Fusion for Early Detection of Active Worms", Sensors, and Command, Control, Communications, and Intelligence (C3iI) Technologies for Homeland Defense and Law Enforcement II, Proceedings of SPIE, vol. 5071, pp. 92-104 (2003).
David Dagon et al., "Worm Population Control Through Periodic Response", Technical Report, Georgia Institute for Technology, Jun. 2004.
Scott Jones et al., "The IPM Model of Computer Virus Management", Computers & Security, vol. 9, pp. 411-418 (1990).
Jeffrey O. Kephart et al., "Directed-Graph Epidemiological Models of Computer Viruses", In Proceedings of IEEE Symposium on Security and Privacy, pp. 343-359 (1991).
Darrell M. Kienzle et al., "Recent Worms: A Survey and Trends", In WORM '03, Proceedings of the 2003 ACM Workshop on Rapid Malcode, Washington, DC, USA, pp. 1-10, Oct. 27, 2003.
Bill McCarty, "Botnets: Big and Bigger", IEEE Security and Privacy Magazine, vol. 1, pp. 87-89 (2003).
Xinzhou Qin et al., "Worm Detection Using Local Networks", Technical Report GIT-CC-04-04, College of Computing, Georgia Institute of Technology, Feb. 2004.
Yang Wang et al., "Modeling the Effects of Timing Parameters on Virus Propagation", In Proceedings of ACM CCS Workshop on Rapid Malcode (WORM '03), Washington, DC, pp. 61-66, Oct. 27, 2003.
Donald J. Welch et al., "Strike Back: Offensive Actions in Information Warfare", in AMC New Security Paradigm Workshop, pp. 47-52 (1999).
T. Liston, "Welcome to my Tarpit: The Tactical and Stragetic Use of LaBrea", http://www.hackbusters.net/LaBrea/LaBrea.txt, Oct. 24, 2001.
R. Pointer, "Eggdrop Development", http://www.eggheads.org, Oct. 1, 2005.
S. Staniford, "Code Red Analysis Pages: July Infestation Analysis", http://silicondefense.org/cr/july.html, Nov. 18, 2001.
Alex MA, "NetGeo—The Internet Geographic Database", http://www.caida.org/tools/utilities/netgeo/index.xml, Sep. 6, 2006.
MathWorks Inc. Simulink, http://www.mathworks.com/products/simulink, Dec. 31, 2005.
David Dagon et al., "Modeling Botnet Propagation Using Time Zones", In Proceedings of the 13th Annual Network and Distributed Systems Security Symposium (NDSS '06), Feb. 2006.
John Canavan, "Symantec Security Response: W32.Bobax.D", http://www.sarc.com/avcent/venc/data/w32.bobax.d.html, May 26, 2004.
"Whois Privacy", www.gnso.icann.org/issues/whois-privacy/index/shtml, Jun. 3, 2005.
John D. Hardin, "The Scanner Tarpit HOWTO", http://www.impsec.org/linus/security/scanner-tarpit.html, Jul. 20, 2002.
Charles J. Krebs, "Ecological Methodology", Harper & Row, Publishers, New York, pp. v-x, 15-37, 155-166, and 190-194 (1989).
D.J. Daley et al., "Epidemic Modeling: An Introduction", Cambridge University Press, pp. vii-ix, 7-15, and 27-38 (1999).
Lance Spitzner, "Honeypots: Tracking Hackers", Addison-Wesley, pp. vii-xiv, 73-139, 141-166, and 229-276 (2003).
International Search Report issued in Application No. PCT/US06/038611 dated Jul. 8, 2008.
Written Opinion issued in Application No. PCT/US06/038611 dated Jul. 8, 2008.
International Preliminary Report on Patentability issued in Application No. PCT/US06/038611 dated Mar. 26, 2009.
O. Diekmann et al,. "Mathematical Epidemiology of Infectious Diseases: Model Building, Analysis and Interpretation", John Wiley & Son, Ltd., 2000, pp. v-xv and 1-303.
Jelena Mirkovic et al,. "Internet Denial of Service: Attack and Defense Mechanisms", Prentice Hall Professional Technical Reference, 2004, pp. v-xxii and 1-372.
"Symantec Internet Security Threat Report: Trends for Jan. 1, 2004-Jun. 30, 2004" Symantec, Sep. 2004, pp. 1-54.
David Dagon et al., "HoneyStat: Local Worm Detection Using Honeypots", RAID 2004, LNCS 3224, pp. 39-58 (2004).
Jonghyun Kim et al., "Measurement and Analysis of Worm Propagation on Internet Network Topology", IEEE, pp. 495-500 (2004).
Andreas Marx, "Outbreak Response Times: Putting AV to the Test", www.virusbtn.com, Feb. 2004, pp. 4-6.
Vinod Yegneswaran et al., "Global Intrusion Detection in the DOMINO Overlay System", Proceedings of Network and Distributed Security Symposium (NDSS), 17 pages Feb. 2004.
Vinod Yegneswaran et al., "On the Design and Use of Internet Sinks for Network Abuse Monitorin", RAID 2004, LNCS 3224, pp. 146-165 (2004).
Cliff Changchun Zou et al., "Worm Propagation Modeling and Analysis Under Dynamic Quarantine Defense", WORM'03, Oct. 27, 2003, Washington, DC USA, 10 pages.
Cliff C. ZOU et al., "Routing Worm: A Fast, Selective Attack Worm Based on IP Address Information", Technical Report: TR-03-CSE-06, Principles of Advanced and Distributed Simulation (PADS) 2005, pp. 199-206, Jun. 1-3, 2005.
Thorsten Holz, "Anti-Honeypot Technology", 21st Chaos Communication Congress, slides 1-57, Dec. 2004.
"CipherTrust's Zombie Stats", http://www.ciphertrust.com/resources/statistics/zombie.php 3 pages, printed Mar. 25, 2009.
Joe Stewart, "Phatbot Trojan Analysis", http://www.secureworks.com/research/threats/phatbot, Mar. 15, 2004, 3 pages.
Thorsten Holz et al., "A Short Visit to the Bot Zoo", IEEE Security & Privacy, pp. 7679 (2005).
Michael Glenn, "A Summary of DoS/DDoS Prevention, Monitoring and Mitigation Techniques in a Service Provider Environment", SANS Institute 2003, Aug. 21, 2003, pp. ii-iv, and 1-30.
Dennis Fisher, "Thwarting the Zombies", Mar. 31, 2003, 2 pages.
Dongeun Kim et al., "Request Rate Adaptive Dispatching Architecture for Scalable Internet Server", Proceedings of the IEEE International Conference on Cluster Computing (CLUSTER'00); pp. 289-296 (2000).
Keisuke Ishibashi et al., "Detecting Mass-Mailing Worm Infected Hosts by Mining DNS Traffic Data", SIGCOMM'05 Workshops, pp. 159-164 (Aug. 22-26, 2005).
Nicholas Weaver et al., "A Taxonomy of Computer Worms", WORM'03, pp. 11-18 (Oct. 27, 2003).
Stephan Axelsson, "The Base-Rate Fallacy and the Difficulty of Intrusion Detection", ACM Transactions on Information and System Security, vol. 3, No. 3, pp. 186-205 (Aug. 2000).
Niel Landwehr et al., "Logistic Model Trees", Machine Learning, vol. 59, pp. 161-205 (2005).
Richard O. Duda et al., "Pattern Classification, Second Edition", John Wiley & Sons, Inc., pp. vii-xx, and 1-654, Copyright 2001.
Guofei Gu et al. "BotMiner: Clustering Analysis of Network Traffic Protocol- and Structure-Independent Botnet Detection", 2008, USENIX Security Symposium, pp. 139-154.
Zhu et al., "Using Failure Information Analysis to Detect Enterprise Zombies," Lecture note of the Institute for Computer Science, Social-Informatics and Telecommunications Engineering, vol. 19, part 4, pp. 185-206, 2009.
Manos Antonakakis et al., "Building a Dynamic Reputation System for DNS", 19th USENIX Security Symposium, Aug. 11-13, 2010 (17 pages).
Manos Antonakakis et al., "Detecting Malware Domains at the Upper DNS Hierarchy", In Proceeding of the 20th USENIX Security Symposium, Aug. 8-12, 2011 (16 pages).
Leyla Bilge et al., "EXPOSURE: Finding Malicious Domains Using Passive DNS Analysis", 18th Annual Network and Distributed System Security Symposium, Feb. 6-9, 2011 (17 pages).
"Virus:Win32/Expiro.Z". http://www.microsoft.com/security/portal/Threat/Encyclopedia/Entry.aspx, Jun. 9, 2011 (5pages).
Mike Geide, "Another Trojan Bamital Pattern", http://research.zscaler.com/2011/05/another-trojan-bamital-pattern.html, May 6, 2011 (5 pages).

(56) References Cited

OTHER PUBLICATIONS

Sergey Golovanov et al., "TDL4—Top Bot", http://www.secuirlist.com/en/analysis/204792180/TDL4_Top_Bot, Jun. 27, 2011 (15 pages).
P. Mockapetris, "Domain Names—Concepts and Facilities", Network Working Group, http://www.ietf.org/rfc/rfc1034.txt, Nov. 1987 (52 pages).
P. Mockapetris, "Domain Names—Implementation and Specification", Network Working Group, http://www.ietf.org/rfc/rfc1035.txt, Nov. 1987 (52 pages).
Phillip Porras et al. "SRI International Technical Report: An Analysis of Conficker's Logic and Rendezvous Points", http://mtc.sri.com/Conficker/, Mar. 19, 2009, (31 pages).
Phillip Porras et al. "SRI International Technical Report: Conficker C Analysis", http://mtc.sri.com/Conficker/addendumC, Apr. 4, 2009, (24 pages).
Paul Royal, Damballa, "Analysis of the Kracken Botnet", Apr. 9, 2008 (13 pages).
Sergei Shevchenko, "Srizbi's Domain Calculator", http://blog.threatexpert.com/2008/11/srizbix-domain-calculator.html, Nov. 28, 2008 (3 pages).
Sergei Shevchenko, "Domain Name Generator for Murofet", http://blog.threatexpert.com/2010/10/domain-name-generator-for-murofet.html, Oct. 14, 2010 (4 pages).
P Akritidis et al., "Efficient Content-Based Detection of Zero-Day Worms", 2005 IEEE International Conference in communications, vol. 2, pp. 837-843, May 2005.
M. Patrick Collins et al., "Hit-List Worm Detection and Bot Identification in Large Networks Using Protocol Graphs", RAID 2007, LNCS 4637, pp. 276-295 (2007).
Nicholas Weaver et al., "Very Fast Containment of Scanning Worms", In proceedings of the 13th USENIX Security Symposium, pp. 29-44, Aug. 9-13, 2004.
David Whyte et al., "DNS-Based Detection of Scanning Worms in an Enterprise Network", In Proc. of the 12th Annual Network and Distributed System Security Symposium, pp. 181-195, Feb. 3-4, 2005.
Cristian Abad et al., "Log Correlation for Intrusion Detection: A Proof of Concept", In Proceedings of The 19th Annual Computer Security Application Conference (ACSAC'03), (11 pages) (2003).
Lala A. Adamic et al., "Zipf's Law and the Internet", Glottometrics, vol. 3, pp. 143-150 (2002).
K.G. Anagnostakis et al., "Detecting Targeted Attacks Using Shadow Honeypots", In Proceedings of the 14th USENX Secuirty Symposium, pp. 129-144 (2005).
Paul Baecher et al., "The Nepenthes Platform: An Efficient Approach to Collect Malware", In Proceedings of Recent Advances in Intrusion Detection (RAID 2006), LNCS 4219, pp. 165-184, Sep. 2006.
Paul Barford et al., "An Inside Look at Botnets", Special Workshop on Malware Detection, Advances in Information Security, Spring Verlag, pp. 171-192 (2006).
James R. Binkley et al., "An Algorithm for Anomaly-Based Botnet Detection", 2nd Workshop on Steps to Reducing Unwanted Traffic on the Internet (SRUTI '06), pp. 43-48, Jul. 7, 2006.
Steven Cheung et al., "Modeling Multistep Cyber Attacks for Scenario Recognition", In Proceedings of the Third DARPA Information Survivability Conference and Exposition (DISCEX III), vol. 1, pp. 284-292, Apr. 22-24, 2003.
Evan Cooke et al., "The Zombie Roundup: Understanding, Detecting, and Disrupting Botnets", Steps to Reducing Unwanted Traffic on the Internet Workshop (SRUTI '05), pp. 39-44, Jul. 7, 2005.
Frederic Cuppens et al., "Alert Correlation in a Cooperative Intrusion Detection Framework", In Proceedings of IEEE Symposium on Security and Privacy 2002, pp. 202-215 (2002).
David Dagon et al., "Modeling Botnet Propagation using Time Zones", The 13th Annual Network and Distributed System Security Symposium 2006, Feb. 2-3, 2006 (18 pages).
Roger Dingledine et al., "Tor: The Second-Generation Onion Router", In Proceedings of the 13th Usenix Security Symposium, pp. 303-320 Aug. 9-13, 2004.

Steven T. Eckman et al., "STATL: An Attack Language for State-Based Intrusion Detection", Journal of Computer Security, vol. 10, pp. 71-103 (2002).
Daniel R. Ellis, et al., "A Behavioral Approach to Worm Detection", WORM'04, Oct. 29, 2004 (11 pages).
Prahlad Fogla et al., "Polymorphic Blending Attacks", In Proceedings of 15th Usenix Security Symposium, pp. 241-256, (2006).
Jan Goebel, "Rishi: Identify Bot Contaminated Hosts by IRC Nickname Evaluation", Hot Bots'07, Apr. 10, 2007 (14 pages).
Koral Ilgun et al., "State transition Analysis: A Rule-Based Intrusion Detection Approach", IEEE Transactions on Software Engineering, vol. 21, No. 3, pp. 181-199, Mar. 1995.
Xuxian Jiang et al., "Profiling Self-Propagating Worms via Behavioral Footprinting", WORM'06, Nov. 3, 2006 (7 pages).
Giovanni Vigna et al., "NetSTAT: A Network-based Intrusion Detection Approach", In Proceedings of the 14th Annual Computer Security Applications Conference (ACSAC '98), pp. 25-34, Dec. 7-11, 1998.
Kelly Jackson Higgins, "Shadowserver to Build 'Sinkhole' Server to Find Errant Bots: new Initiative Will Emulate IRC, HTTP Botnet Traffic", http://darkreading.com/taxonomy/index/printarticle/id/211201241. Sep. 24, 2008 (2 pages).
Kelly Jackson Higgins, "Hacking a New DNS Attack: DNS Expert Disputes Georgia Tach and Google Research That Points to Malicious Deployment of Certain Types of DNS Servers", http://darkreading.com/taxonomy/index/printarticle/id/208803784. Dec. 18, 2007 (2 pages).
Christian Kreibich, "Honeycomb: Automated Signature Creation Using Honeypots", http://www.icir.org/christain/honeycomb/index.html, Mar. 26, 2007, (3 pages).
Artem Dinaburg et al., "Ether: Malware Analysis via Hardware Virtualization Extensions", CCS'08, Oct. 27-31, 2008 (12 pages).
Paul Royal, "Alternative Medicine: The Malware Analyst's Blue Pill", Black Hat USA 2008, Aug. 6, 2008 (33 pages).
Paul Royal, "Alternative Medicine: The Malware Analyst's Blue Pill", www.damballa.com/downloads/r_pubs/KrakenWhitepaper.pdf (2008) (3pages).
Robert Perdisci et al., "Behavioral Clustering of HTTP-Based Malware and Signature Generation Using Malicious Network Traces", Usenix Symposium on Networked Systems Design and Implementation (NSDI 2010), (2010) (16 Pages).
Christopher Kruegel et al., "Polymorphic Worm Detection using Structural Information of Executables", RAID 2005, pp. 207-226 (2005).
Paul Vixie, "DNS Complexity", ACM Queue, pp. 24-29, Apr. 2007.
Ke Wang et al., "Anagram: A Content Anomaly Detector Resistant to Mimicry Attack", In Proceedings of the International Symposium on Recent Advances in Intrusion Detection (RAID) (2006) (20 pages).
Ke Wang et al., "Anomalous Payload-Based Worm Detection and Signature Generation", In Proceedings of the International Symposium on Recent Advances in Intrusion Detection (RAID) (2005) (20 pages).
David Whyte, "Exposure Maps: Removing Reliance on Attribution During Scan Detection", 1st Usenix Workshop on Hot Topics in Security, pp. 51-55 (2006).
Jiahai Yang et al., "CARDS: A Distributed System for Detecting Coordinated Attacks", In Sec (2000) (10 pages).
Vinod Yegneswaran et al., "Using Honeynets for Internet Situational Awareness", In proceedings of the Fourth Workshop on Hot Topics in Networks (HotNets IV), Nov. 2005 (6 pages).
David Dagon et al., "Corrupted DNS Resolution Paths: The Rise of a Malicious Resolution Authority", In Proceedings of Network and Distributed Security Symposium (NDSS '08) (2008) (15 pages).
Dihe's IP-Index Browser, http://ipindex.homelinux.net/index.php, updated Oct. 13, 2012 (1 page).
Shuang Hao et al., "An Internet-Wide View into DNS Lookup Patterns", http://labs.verisign.com/projects/malicious-domain-names/white-paper/dns-imc2010.pdf (2010) (6 pages).
Thorsten-Holz et al., "Measuring and Detecting Fast-Flux Service Networks", In Proceedings of NDSS (2008) (12 pages).

(56) References Cited

OTHER PUBLICATIONS

Jaeyeon Jung et al., "DNS Performance and the Effectiveness of Caching", IEEE/ACM Transactions on Networking, vol. 10, No. 5, pp. 589-603, Oct. 2002.
The Honeynet Project & Research Alliance, "Know Your Enemy: Fast-Flux Service Networks: An Ever Changing Enemy", http://old.honeynet.org/papers/ff/fast-flux.html, Jul. 13, 2007 (10 pages).
Duane Wessels et al., "Measurements and Laboratory Simulations of the Upper DNS Hierarchy", In PAM (2005) (10 pages).
Joe Stewart, "Top Spam Botnets Exposed", http://www.secureworks.com/cyber-threat-intelligence/threats/topbotnets/, Apr. 8, 2008 (11 pages).
Brett Stone-Gross et al., "Your Botnet is My Botnet: Analysis of a Botnet Takeover", CCS'09, Nov. 9-13, 2009 (13 pages).
Sam Stover et al., "Analysis of the Storm and Nugache Trojans: P2P is here", Login, vol. 32, No. 6, pp. 18-27, Dec. 2007.
"Storm Botnet", http://en.wikipedia.org/wiki/Storm_botnet, Printed Jan. 29, 2013 (7 pages).
Jeff Williams, "What We Know (and Learn) for the Waledac Takedown", http://blogs.technet.com/b/mmpc/archive/2010/03/15/what-we-know-and-learned-from-the-waledac-takedown.aspx, Mar. 15, 2010 (2 pages).
"Trojan:Java/Boonan", http://microsoft.com/security/portal/threat/encyclopedia/entry.aspx?Name=Trojan%3AJava%2FBoonan, Apr. 17, 2011 (5 pages).
Julia Wolf, "Technical Details of Srizbi's Domain Generation Algorithm", http://blog.fireeye.com/research/2008/11/technical-details-of-srizbis-domain-generation-algorithm.html, Nov. 25, 2008 (4 pages).
Sandeep Yadav et al., "Detecting Algorithmically Generated Malicious Domain Names", In Proceedings of the 10th Annual Conference on Internet Measurement (IMC'10), pp. 48-61, Nov. 1-3, 2010.
"TEMU: The BitBlaze Dynamic Analysis Component", http://bitblaze.cs.berkeley.edu/temu.html, printed Jan. 29, 2013 (1 page).
Paul Bacher et al., "Know Your Enemy: Tracking Botnets: Using Honeynets to Learn More About Bots", http://www.honeynet.org/papers/bots, Aug. 10, 2008 (1 page).
Michael Bailey et al., "Automated Classification and Analysis of Internet Malware", RAID 2007, LNCS 4637, pp. 178-197 (2007).
Paul Barham et al., "Xen and the Art of Virtualization", SOSP'03, Oct. 19-22, 2003 (14 pages).
Ulrich Bayer et al., "TTAnalyze: A Tool for Analyzing Malware", In Proceedings of the 15th Annual Conference European Institute for Computer Antivirus Research (EICAR), pp. 180-192 (2006).
Fabrice Bellard, "QEMU, A Fast and Portable Dynamic Translator", In Proceedings of the Annual Confernce on Usenix Annual Technical Conference, pp. 41-46 (2005).
Kevin Borders et al., "Siren: Catching Evasive Malware (Short Paper)", IEEE Symposium on Security and Privacy, pp. 78-85, May 21-24, 2006.
Christopher M. Bishop, Pattern Recognition and Machine Learning (Information Science and Statistics), Springer-Verlag New York, Inc., Secauscus, NJ, USA, 2006.
Ronen Feldman et al., "The Text Mining Handbook: Advance Approaches in Analyzing Unstructured Data", Cambridge Univ. Pr., 2007.
Michael Hale Ligh et al., "Malware Analyst's Cookbook and DVD", Wiley, 2010.
M. Newman, "Networks: An Introduction", Oxford University Press, 2010.
Matt Bishop, "Computer Security: Art and Science", Addison-Wesley Professional, 2003.
Neils Provos et al., "Virtual Honeypots: Form Botnet Tracking to Intrusion Detection", Addison-Wesley Professional, Reading, 2007.
Michael Sipser, "Introduction to the Theory of Computation", International Thomson Publishing, 1996.
Peter Szor, "The Art of Computer Virus Research and Defense", Addison-Wesley Professional, 2005.
Anil K. Jain et al., "Algorithms for Clustering Data", Prentice-Hall, Inc., 1988.
V. Laurikari, "TRE", 2006 (5 pages).
P. Porras, "Inside Risks: Reflections on Conficker", Communications of the ACM, vol. 52, No. 10, pp. 23-24, Oct. 2009.
Changda Wang et al., "The Dilemma of Covert Channels Searching", ICISC 2005, LNCS 3935, pp. 169-174, 2006.
C. Willems et al., "Toward Automated Dynamic Malware Analysis Using CWSandbox", IEEE Security and Privacy, vol. 5, No. 2, pp. 32-39, 2007.
R Developmental Core Team, "R: A Language and Environment for statistical Computing", R. Foundation for Statistical Computing, Vienna Austria, 2008.
Simon Urbanek, "rJava: Low-Level-R to Java Interface", printed May 6, 2013 (5 pages).
Juan Caballero et al., "Polyglot: Automatic Extraction of Protocol Message Format Using Dynamic Binary Analysis", In Proceedings of ACM Conference on Computer and Communication Security, Oct. 2007 (15 pages).
Mihai Christodorescu et al., "Semantics-Aware Malware Detection", In Proceeding of the 2005 IEEE Symposium on Security and Privacy, pp. 32-46 (2005).
Mihai Christodorescu et al,. "Mining Specifications on Malicious Behavior", ESEC/FSE'07, Sep. 3-7, 2007 (10 pages).
Peter Ferrie, "Attacks on Virtual Machine Emulators", Symantec Advance Threat Research, 2006 (13 pages).
Peter Ferrie, "Attacks on More Virtual Machine Emulators", Symantec Advance Threat Research, http://pferrie.tripod.com/papers/attacks2.pdf, 2007 (17 pages).
Tal Garfinkel et al., "A Virtual Machine Introspection Based Architecture for Intrusion Detection", In Proceedings of Network and Distributed Systems Security Symposium, Feb. 2003 (16 pages).
G. Hunt et al., "Detours: Binary Interception of WIN32 Functions", Proceedings of the 3rd Usenix Windows NT Symposium, Jul. 12-13, 1999 (9 pages).
Xuxian Jiang et al., "Stealthy Malware Detection Through VMM-Based "Out-of-the-Box" Semantic View Reconstruction", CCS'07, Oct. 29-Nov. 2, 2007 (11 pages).
Xuxian Jiang et al., "Virtual Playgrounds for Worm Behavior Investigation", RAID 2005, LNCS 3858, pp. 1-21 (2006).
Min Gyung Kang et al., "Renovo: A Hidden Code Extract for Packed Executables", WORM'07, Nov. 2, 2007 (8 pages).
Christopher Kruegel et al., "Detecting Kernel-Level Rootkits Through Binary Analysis", In Proceedings of the Annual Computer Security Applications Conference (ACSAC), pp. 91-100, Dec. 2004.
Lorenzo Martignoni et al., "OmniUnpack: Fast, Generic, and Safe Unpacking of Malware", In Proceedings of the Annual Computer Security Applications Conference (ACSAC), pp. 431-441 (2007).
Thomas Raffetseder et al., "Detecting System Emulators", In ISC, pp. 1-18 (2007).
Paul Royal et al., "PolyUnpack: Automating the Hidden-Code Extraction of Unpack-Executing Malware", In Proceedings of the Annual Computer Security Applications Conference (ACSAC), pp. 289-300 (2006).
Rich Uhlig et al., "Intel Virualization Technology", Computer, vol. 38, No. 5, pp. 48-56, May 2005.
Amit Vasudevan et al., "Stealth Breakpoints", In Proceedings of the 21st Annual Computer Security Applications Conference (ACSAC), pp. 381-392, (2005).
Amit Vasudevan et al., "Cobra: Fine-Grained Malware Analysis Using Stealth Localized-Executions", In Proceedings of the 2006 IEEE Symposium on Security and Privacy (S&P'06), pp. 264-279 (2006).
Yi-Min Wang et al., "Automated Web Patrol with Strider HoneyMonkeys: Finding Web Sites That Exploit Browser Vulnerabilities", In NDSS'06 (2006) (15 pages).
Heng Yin et al., "Panorama: Capturing System-Wide Information Flow for Malware Detection and Analysis", In Proceedings of ACM Conference on Computer and Communication Security, Oct. 29-Nov. 2, 2007 (13 pages).
Joanna Rutkowska, "Introducing Blue Pill", http://theinvisbilethings.blogspot.com/2006/06/introducing-blue-pill.html, Jun. 22, 2006 (26 pages).
Peter Ferrie, "Anti-Unpacker Tricks", In Proceedings of the 2nd International CARO Workshop (2008) (25 pages).

(56) References Cited

OTHER PUBLICATIONS

Danny Quist, "Covert Debugging Circumventing Software Armoring Techniques"; In Proceedings of Black Hat USA 2007 (2007) (5 pages).
Ulrich Bayer et al., "Scalable, Behavior-Based malware Clustering", In Network and Distributed System Security Symposium (2009) (18 pages).
David Brumley et al., "Automatically Identifying Trigger-Based Behavior in Malware", Botnet Detection, pp. 1-24 (2008).
Dancho Danchev, "Web Based Botnet Command and Control Kit 2.0", http://ddanchev.blogspot.com/2008/08/web-based-botnet-command-and-control.html, Aug. 22, 2008 (5 pages).
Ozgun Erdogan et al., "Hash-AV: Fast Virus Signature matching by Cache-Resident Filters", Int. J. Secur. Netw., vol. 2. pp. 50-59 (2007).
Fanglu Guo et al., "A Study of the Packer Problem and Its Solutions", In Recent Advances in Intrusion Detection (RAID 2008), LNCS 5230, pp. 95-115 (2008).
Maria Halkidi et al., "On Clustering Validation Techniques", Journal of Intelligent Information Systems, vol. 17, pp. 107-145 (2001).
A.K. Jain et al., "Data Clustering: A Review", ACM Computing Surveys, vol. 31, No. 3, pp. 264-323, Sep. 1999.
John P. John et al., "Studying Spamming Botnets using Botlab", In Usenix Symposium on Networked Systems Design and Implementation (NDSI), (2009) (16 pages).
Hyang-Ah Kim et al., "Autograph: Toward Automated, distributed Worm Signature Detection", In Usenix Security Symposium (2004) (16 pages).
Clemens Kolbitsch et al., "Effective and Efficient Malwere Detection at the End Host", In 18th Usenix Security Symposium, pp. 351-366 (2009).
Kevin Borders et al., "Protecting Confidential Data on Personal Computers with Storage Capsules", In 18th Usenix Security Symposium, pp. 367-382 (2009).
Ralf Hund et al., "Return-Oriented Rootkits: Bypassing Kernel Code Integrity Protection Mechanisms", In 18th Usenix Security Symposium, pp. 383-398 (2009).
Christian Kreibich et al., "Honeycomb—Creating Intrusion Detection Signatures Using Honeypots", In ACM Workshop on Hot Topics in Networks (2003) (6 pages).
Zhichun Li et al., "Hamsa: Fast Signature Generational for Zero-Day Polymorphic Worms with Provable Attack Resilience", In IEEE Symposium on Security and Privacy (2006) (15 pages).
James Newsome et al., "Polygraph: Automatically Generating Signatures for Polymorphic Worms", In IEEE Symposium on Security and Privacy (2005) (16 pages).
Sun Wu et al., "AGREP—A Fast Approximate Pattern-Matching Tool", In Usenix Technical Conference (1992) (10 pages).
Vinod Yegneswaren et al.,, "An Architecture for Generating Semantics-Aware Signatures", In Usenix Security Symposium (2005) (16 pages).
Jaeyeon Jung, "Fast Portscan Detection Using Sequential Hypothesis Testing", In Proceedings of IEEE Symposium on Security Privacy, pp. 211-225 (2004).
Anestis Karasaridis et al., "Wide-Scale Botnet Detection and Characterization", In Usenix Workshop on Hot Topics in Understanding Botnets (HotBots'07), Apr. 11-13, 2007 (9 pages).
Carl Livades et al., "Using Machine Learning Techniques to Identify Botnet Traffic", In 2nd IEEE LCN Workshop on Network Security (WoNS'2006), pp. 967-974 (2006).
"CVE-2006-3439", http://cve.mitre.org/cgi-bin/cvename.cgi?name=CVE-2006-3439, printed Jun. 27, 2012 (2 pages).
David Moore, "Inferring Internet Denial-of-Service Activity", In Proceedings of the 10th Usenix Security Symposium, Aug. 13-17, 2001 (15 pages).
Peng Ning et al., "Constructing Attack Scenarios Through Correlation of Intrusion Alerts", In Proceedings of Computer and Communications Security (CCS'02), Nov. 18-22, 2002 (10 pages).
Vern Paxson, "Bro: A System for Detecting Network Intruders in Real-Time", In Proceedings of the 7th Usenix Security Symposium, Jan. 26-29, 1998 (22 pages).
Roberto Perdisci et al., "Using an Ensemble of One-Class SVM Classifiers to Harden Payload-Based Anomaly Detection Systems", In Proceedings of the 6th International Conference on Data Mining (ICDM'06), pp. 488-498, Dec. 2006.
Phillip A. Porras, "Privacy-Enabled Global Threat Monitoring", IEEE Security & Privacy, pp. 60-63 (2006).
Moheeb Abu Rajab et al., "A Multifaceted Approach to Understanding the Botnet Phenomenon", In Proceedings of the ACM SIGCOMM/Usenix Internet Measurement Conference (ICM'06), Oct. 25-27, 2006 (12 pages).
Anirudh Ramachandran et al., "Understanding the Network-Level Behavior of Spammers", In Proceedings of the 2006 Conference on Applications, Technologies, Architectures, and Protocols for Computer Communications (SIGCOMM'06), Sep. 11-16, 2006 (13 pages).
Martin Roesch, "SNORT—Lightweight Intrusion Detection for Networks", In Proceedings of 13th System Administration Conference (LISA'99), pp. 229-238, Nov. 7-12, 1999.
Robin Sommer et al., "Enhancing Byte-Level Network Intrusion Detection Signatures with Context", In Proceedings of the 10th ACM Conference on Computer and Communications Security (CCS'03), pp. 262-271, Oct. 27-30, 2003.
"W32/IRCBot-TO", http://www.sophos.com/virusinfo/analyses.w32ircbotto.html, Jan. 19, 2007 (1 page).
Stuart Staniford et al., "Practical Automated Detection of Stealthy Portscans", Journal of Computer Security, vol. 10, pp. 105-136 (2002).
S. Staniford-Chen et al., "GrIDS—A Graph Based Intrusion Detection System for Large Networks", In Proceedings of the 19th National Information Systems Security Conference, pp. 361-370 (1996).
Steven J. Templeton et al., "A Requires/Provides Model for Computer Attacks", In Proceedings of the 2000 Workshop on New Security Paradigms (NSPW'00), pp. 31-38 (2000).
Alfonso Valdes et al., "Probabilistic Alert Correlation", In Proceedings of the Recent Attack in Intrusion Detection (RAID 2001), LNCS 2212, pp. 54-68 (2001).
Fredrik Valeur et al., "A Comprehensive Approach to Intrusion Detection Alert Correlation", IEEE Transactions on Dependable and Secure Computing, vol. 1, No. 3, pp. 146-169, Jul. 2004.
Kjersti Aas et al., "Text Categorisation: A Survey", Norwegian Computing Center, Jun. 1999 (38 pages).
M. Andrews, "Negative Caching of DNS Queries (DNS NCACHE)", http://tools.ietf.org/html/rfc2308, Mar. 1998 (20 pages).
Simon Biles, "Detecting the Unknown with Snort and Statistical Packet Anomaly Detecting Engine", www.cs.luc.edu/~pld/courses/447/sum08/class6/biles.spade.pdf (2003) (9 pages).
James Newsome et al., "Paragraph: Thwarting Signature Learning by Training Maliciously", In Recent Advance in Intrusion Detection (RAID), 2005 (21 pages).
Jon Oberheide et al., "CloudAV: N-Version Antivirus in the Network Cloud", In Proceedings of the 17th Usenix Security Symposium, pp. 91-106 (2008).
Dan Pelleg et al., "X-Means: Extending K-Means with Efficient Estimation of the Number of Clusters", In International Conference on Machine Learning (2000) (8 pages).
Roberto Perdisci et al., "Misleading Worm Signature Generators Using Deliberate Noise Injection", In IEEE Symposium on Security and Privacy (2006) (15 pages).
Mark Felegyhazi et al., "On the Potential of Proactive Domain Blacklisting", In the Third Usenix LEET Workshop (2010) (8 pages).
Konrad Rieck et al., "Learning and Classification of Malware Behavior", DIMVA 2008, LNCS 5137, pp. 108-125 (2008).
Sumeet Singh et al., "Automated Worm Fingerprinting", In ACM/USENIX Symposium on Operating System Design and Implementation, Dec. 2004 (16 pages).
"EFnet Chat Network", http://www.efnet.org, dated Jun. 18, 2007 (3 pages).

(56) References Cited

OTHER PUBLICATIONS

Guofei Gu et al. "Bothunter: Detecting Malware Infection Through IDS-Driven Dialog Correlation", Proceedings of 16th USENIX Security Symposium, pp. 167-182 (2007).
The Conficker Working Group, "Conficker Working Group: Lessons Learned", Conficker_Working_Group_Lessons_Learned_17_June_2010_final.pdf, published Jan. 2011 (59 pages).
Manos Antonakakis et al., "The Command Structure of the Aurora Bonet", http://www.damballa.com/downloads/r_pubs/Aurora_Botnet_Command_Structure.pdf, 2010 (31 pages).
R. Arends et al., "Protocol Modifications for the DNS Security Extensions", htp://www.ietf.org/rfc/rfc4035.txt, Mar. 2005 (50 pages).
R. Arends et al., "DNS Security Introduction and Requirements", htp://www.ietf.org/rfc/rfc4033.txt, Mar. 2005 (20 pages).
R. Arends et al., "Resource Records for the DNS Security Extensions", htp://www.ietf.org/rfc/rfc4034.txt, Mar. 2005 (28 pages).
Andreas Berger et al., "Assessing the Real-World Dynamics of DNS", Lecture Notes in Computer Science, vol. 7189, pp. 1-14 (2012).
Global Research & Analysis Team (GReAT), "Full Analysis of Flame's Command & Control Servers", http://www.securelist.com/en/blog/750/Full_Analysis_of_Flames_Command_Control_Servers, Sep. 17, 2012 (10 pages).
Nicolas Falliere et al., "W32.Stuxnet Dossier", http://www.symantec.com/content/en/us/enterprise/media/security_response/whitepapers/w32_stuxnet_dossier.pdf, Feb. 2011 (69 pages).
Steinar H. Gunderson, "Global IPv6 Statistics: Measuring the Current State of IPv6 for Ordinary Users", http://meetings.ripe.net/ripe-57/presentations/Colitti-Global_IPv6_statistics_-_Measuring_the_current_state_of_IPv6_for_ordinary_users_.7gzD.pdf, Oct. 24-30, 2008 (20 pages).
Jaeyeon Jung et al., "Modeling TTL-Based Internet Caches", IEEE INFOCOM 2003, pp. 417-426, Mar. 2003.
Srinivas Krishnan et al., "DNS Prefetching and Its Privacy Implications: When Good Things Go Bad", In Proceeding of the 3rd USENIX Conference on Large-Scale Exploits and Emergent Threats: Botnets, Spyware, Worms, and More (LEET'10), (2010) (9 pages).
Zhuoqing Morley Mao et al., "A Precise and Efficient Evaluation of the Proximity Between Web Clients and Their Local DNS Servers", In Proceedings of USENIX Annual Technical Conference (2002) (14 pages).
Mozilla Foundation, "Public Suffix List", http://publicsuffix.org/, printed May 23, 2013 (8 pages).
David Plonka et al., "Context-Aware Clustering of DNS Query Traffic", In Proceedings of the 8th IMC (2008) (13 pages).
RSA FraudAction Research Labs, "Anatomy of an Attack", http://blogs/rsa.com/rivner/anatomy-of-an-attack/, Apr. 1, 2011 (17 pages).
Steve Souders, "Sharing Dominant Domains", http://www.stevesouders.com/blog/2009/05/12/sharding-dominant-domains, May 12, 2009 (3 pages).
Paul Vixie, "What DNS Is Not", Communications of the ACM, vol. 52, No. 12, pp. 43-47, Dec. 2009.
N. Weaver et al., "Redirecting DNS for ADS and Profit", In USENIX Workshop on Free and Open communications on the Internet (FOCI), Aug. 2011 (6 pages).
Florian Weimer, "Passive DNS Replication", In Proceedings of the 17th Annual FIRST Conference on Computer Security Incident, Apr. 2005 (13 pages).
Manos Antonakakis et al., "Unveiling the Network Criminal Infrastructure of TDSS/TDL4", http://www.damballa.com/downloads/r_pubs/Damballa_tdss_tdl4_case_study_public.pdf, (undated) (16 pages).
Manos Antonakakis et al., "From Throw-Away Traffic to Bots: Detecting the Rise of DGA-Based Malware", In Proceedings of the 21st USENIX Conference on Security Symposium (Security'12), (2012) (16 pages).
T. Berners-Lee et al., "RFC3986—Uniform Resource Identifier (URI): Generic Syntax", http://www.hjp.at/doc/rfc/rfc3986.html, Jan. 2005 (62 pages).
Juan Caballero et al., "Measuring Pay-Per-Install: The Commoditization of malware Distribution", In Proceedings of the 20th USENIX Conference on Security (SEC'11), (2011) (16 pages).
Chih-Chung Chang et al., "LIBSVM: A Library for Support Vector Machines" ACM Transactions on Intelligent Systems and Technology 2011, Last Updated Jun. 14, 2007 (26 pages).
Dancho Danchev, "Leaked DIY Malware Generating Tool Spotted in the Wild", http://blog.webroot.com/2013/01/18/leaked-diy-malware-generating-tool-spotted-in- the-wild/, Jan. 18, 2013 (6 pages).
D. De La Higuera et al., "Topology of Strings: Median String is NP-Complete", Theoretical Computer Science, vol. 230, pp. 39-48 (2000).
Robert Edmonds, "ISC Passive DNS Architecture", http://kb.isc.org/getAttach/30/AA-00654/passive-dns-architecture.pdf, Mar. 2012 (18 pages).
Manuel Egele et al., "A Survey on Automated Dynamic Malware-Analysis Techniques and Tools", ACM Computing Surveys, vol. 44, No. 2, Article 6, pp. 6:1-6:42, Feb. 2012.
Dennis Fisher, "Zeus Source Code Leaked", http://threatpost.com/en_us/blogs/zeus-source-code-leaked-051011, May 10, 2011 (6 pages).
Guofei Gu et al., "BotSniffer: Detecting Botnet Command and Control Channels in Network Traffic", In Proceedings of the 15th Annual Network and Distributed System Security Symposium (NDSS'08), Feb. 2008 (18 pages).
Grefoire Jacob, "Jackstraws: Picking Command and Control Connections from Bot Traffic", In Proceedings of the 20th USENIX Conference on Security (SEC'11) (2011) (16 pages).
Jiyong Jang et al., "Bitshred: Feature Hashing Malware for Scalable Triage and Semantic Analysis", In Proceedings of the 18th ACM Conference on Computer and Communications Security (CCS'11), pp. 309-320, Oct. 17-21, 2011.
J. Zico Kolter et al., "Learning to Detect and Classify Malicious Executables in the Wild", Journal of Machine Learning Research, vol. 7, pp. 2721-2744, Dec. 2006.
John C. Platt, "Probablistic Outputs for Support Vector Machines and Comparisons to Regularized Likelihood Methods", Advances in Large margin Classifiers, vol. 10, No. 3, pp. 61-74, Mar. 26, 1999.
Team Cymru, "Developing Botnets", http://www.team-cymru.com/ReadingRoom/Whitepapers/2010/developing-botnets.pdf (2010) (3 pages).
Brett Stone-Gross et al., "Pushdo Downloader Variant Generating Fake HTTP Requests", http://www.secureworks.com/cyber-threat-intelligence/threats/Pushdo_Downloader_Variant_Generating_Fake_HTTP_Requests/, Aug. 31, 2012 (4 pages).
Peter Wurzinger et al., "Automatically Generating Models for Botnet Detection", In Proceedings of the 14th European Conference on Research in Computer Security (ESORICS'09), pp. 232-249 (2009).
Yinglian Xie et al., "Spamming Botnet: Signatures and Characteristics", In Proceeding of the ACM SIGCOMM 2008 Conference on Data Communications (SIGCOMM'08), pp. 171-182, Aug. 17-22, 2008.
Yajin Zhou et al., "Dissecting Android Malware: Characterization and Evolution", 2012 IEEE Symposium on Security and Privacy, pp. 95-109 (2012).
Nello Cristianini et al., "An Introduction to Support Vector Machines: and other Kernal-Based Learning Methods", Cambridge University Press, New York, NY, USA (2000).
Timo Sirainen, "IRSSI", http://en.wikipedia.org/wiki/Irssi, updated May 8, 2013 (3 pages).
Team Cymru, "IP to ASN Mapping", http://www.team-cymru.org/Services/ip-to-asn.html, printed Mar. 23, 2013 (6 pages).
http://www.bleedingsnort.com, retrieved from Internet Archive on May 23, 2013, Archived Sep. 26, 2006 (3 pages).
http://www.dshield.org, retrieved from Internet Archive on May 23, 2013, Archived Sep. 29, 2006 (2 pages).
http://www.alexa.com, retrieved from Internet Archive on May 23, 2013, Archived Sep. 25, 2006 (3 pages).
https://sie.isc.org/, retrieved from Internet Archive on May 23, 2013, Archived Dec. 29, 2008 (2 pages).
http://damballa.com, retrieved from Internet Archive on May 23, 2013, Archived Jan. 28, 2007 (10 pages).

(56) References Cited

OTHER PUBLICATIONS http://www.dnswl.org, retrieved from Internet Archive on May 23, 2013, Archived Jul. 15, 2006 (4 pages).
http://www.spamhaus.org/sbl/, retrieved from Internet Archive on May 23, 2013, Archived Sep. 24, 2006 (24 pages).
http://malwaredomains.com, retrieved from Internet Archive on May 23, 2013, Archived Dec. 28, 2007 (12 pages).
http://www.opendns.com, retrieved from Internet Archive on May 23, 2013, Archived Sep. 9, 2006 (25 pages).
https://zeustracker.abuse.ch, retrieved from Internet Archive on May 23, 2013, Archived Oct. 26, 2010 (37 pages).
http://www.threatfire.com, retrieved from Internet Archive on May 23, 2013, Archived Aug. 22, 2007 (18 pages).
http://www.avira.com, retrieved from Internet Archive on May 23, 2013, Archived Sep. 29, 2006 (13 pages).
https://alliance.mwcollect.org, retrieved from Internet Archive on May 23, 2013, Archived Jan. 7, 2007 (2 pages).
http://malfease.oarci.net, retrieved from Internet Archive on Apr. 11, 2014, Archived Apr. 12, 2008 (2 pages).
http://www.oreans.com/themida.php, retrieved from Internet Archive on May 23, 2013, Archived Aug. 23, 2006 (12 pages).
http://www.vmware.com, retrieved from Internet Archive on May 23, 2013, Archived Sep. 26, 2006 (32 pages).
Thomas Ptacek, "Side-Channel Detection Attacks Against Unauthorized Hypervisors", http://www.matasano.com/log/930/side-channel-detection-attacks- against-unauthorized-hypervisors/, Aug. 20, 2007, retrieved from Internet Archive on May 23, 2013, Archived Aug. 27, 2007 (12 pages).
http://cyber-ta.org/releases/botHunter/index.html, retrieved from Internet Archive on May 23, 2013, Archived Aug. 30, 2007 (6 pages).
http://anubis.seclab.tuwien.ac.at, retrieved from Internet Archive on May 23, 2013, Archived Apr. 9, 2008 (2 pages).
http://www.siliconrealms.com, retrieved from Internet Archive on May 23, 2013, Archived Sep. 4, 2006 (12 pages).
http://bitblaze.cs.berkeley.edu, retrieved from Internet Archive on May 23, 2013, Archived Jan. 28, 2008 (4 pages).
http://www.dyninst.org, retrieved from Internet Archive on May 23, 2013, Archived Aug. 20, 2006 ( pages).
http://www.peid.info, retrieved from Internet Archive on May 23, 2013, Archived Dec. 4, 2007 (2 pages).
Mark Russinovich et al., "RegMon for Windows V7.04", http://technet.microsoft.com/en-us/sysinternals/bb896652.aspx, Published Nov. 1, 2006 (4 pages).
"Troj/Agobot-IB", http://www.sophos.com/virusinfo/analyses/trojagobotib.html, printed Jun. 27, 2012 (1 page).
Mark Russinovich et al., "FileMon for Windows V7.04", http://technet.microsoft.com/en-us/sysinternals/bb896642.aspx, Nov. 1, 2006 (6 pages).
"Norman Sandbox Whitepaper", Copyright Norman 2003 (19 pages).
Tanveer Alam et al., "Webinar: Intel Virtualization Technology of Embedded Applications", Intel, Copyright 2010 (34 pages).
F. Heinz et al., "IP Tunneling Through Nameserver", http://slashdot.org/story/00/09/10/2230242/ip-tunneling-through-nameservers, Sep. 10, 2000 (23 Pages).
http://www.mcafee.com/us/, printed May 23, 2013 (23 pages).
"Windows Virtual PC", http://en.wikipedia.org/wiki/Windows_Virtual_PC, Last Modified May 5, 2013, Printed May 23, 2013 (21 pages).
Par Fabien Perigaud, "New Pill?", http://cert.lexsi.com/weblog/index.php/2008/03/21/223-new-pill, Mar. 21, 2008 (3 pages).
http://handlers.sans.org/jclausing/userdb.txt, printed May 24, 2013 (149 pages).
Avi Kivity et al., "KVM: The Linux Virtual Machine Monitor", Proceedings of the Linux Symposium, pp. 225-230, Jun. 27-30, 2007.
Symantec, "Symantec Global Internet Security Threat Report: Trends for 2008", vol. XIV, Apr. 2009 (110 pages).
File History of U.S. Appl. No. 14/015,621.
File History of U.S. Appl. No. 14/015,661.
File History of U.S. Appl. No. 14/194,076.
Leo Breiman, "Bagging Predictors", Machine Learning, vol. 24, pp. 123-140 (1996).
David S. Anderson et al., "Spamscatter: Characterizing Internet Scam Hosting Infrastructure", Proceedings of the USENIX Security Symposium (2007) (14 pages).
Sujata Garera et al., "A Framework for Detection and Measurement of Phishing Attacks", WORM'07, pp. 1-8, Nov. 2, 2007.
Torsten Horthorn et al., "Double-Bagging: Combining Classifiers by Bootstrap Aggregation", Pattern Recognition, vol. 36, pp. 1303-1309 (2003).
Roberto Perdisci et al., "Detecting Malicious Flux Service Networks Through Passive Analysis of Recursive DNS Traces", Proceedings of ACSAC, Honolulu, Hawaii, USA (2009) (10 pages).
Shuang Hao et al., "Detecting Spammers with SNARE: Spatiotemporal Network- Level Automatic Reputation Engine", 18th USENIX Security Symposium, pp. 101-117 (2009).
Kazumichi Sato et al., "Extending Black Domain Name List by Using Co-Occurrence Relation Between DNS Queries", Presentation in The Third USENIX LEET Workshop (2010) (22 pages).
Sushant Sinha et al., "Shades of Grey: On the Effectiveness of Reputation-Based Blacklists", In 3rd International Conference on MALWARE (2008) (8 pages).
Zhiyun Qian et al., "On Network-Level Clusters for Spam Detection", In Proceedings of the USENIX NDSS Symposium (2010) (17 pages).
Bojan Zdrnja et al., "Passive Monitoring of DNS Anomalies", In Proceedings of DIMVA Conference (2007) (11 pages).
Jian Zhang et al., "Highly Predictive Blacklisting", In Proceedings of the USENIX Security Symposium (2008) (16 pages).
http://www.uribl.com/about.shtml, retrieved from Internet Archive on Mar. 16, 2016, Archived Jul. 22, 2010 (4 pages).
http://www.spamhaus.org/zen/, retrieved from Internet Archive on Mar. 16, 2016, Archived Jul. 6, 2010 (3 pages).
Mathew Sullivan, "Fighting Spam by Finding and Listing Exploitable Servers", Apricot 2006 (26 pages).
File History of U.S. Appl. No. 14/304,015.
File History of U.S. Appl. No. 12/538,612.
File History of U.S. Appl. No. 13/205,928.
File History of U.S. Appl. No. 13/309,202.
File History of U.S. Appl. No. 13/749,205.
File History of U.S. Appl. No. 14/015,582.
File History of U.S. Appl. No. 14/015,663.
File History of U.S. Appl. No. 14/015,704.
File History of U.S. Appl. No. 14/041,796.
File History of U.S. Appl. No. 14/096,803.
File History of U.S. Appl. No. 14/305,998.
File History of U.S. Appl. No. 14/317,785.
File History of U.S. Appl. No. 14/616,387.
File History of U.S. Appl. No. 14/668,329.
File History of U.S. Appl. No. 15/019,272.
Mekky et al. (Detecting Malicious HTTP Redirections Using Trees of User Browser Activity, IEEE INFOCOM 2014, pp. 1159-1167).
Nan Jiang et al., "Identifying Suspicious Activities Through DNS Failure Graph Analysis", In proceedings of the 18th IEEE International Conference on Network Protocols (ICNP'10) IEEE Computer Society, Washington, DC, USA, 144-153 (2010).
Park et al. "Fast Malware Classification by Automated Behavioral Graph Matching" (2010) Proceedings of the Sixth Annual Workshop on Cyber Security and Information Intelligence Research (CSIIRW '10), ACM pp. 1-4.
Zou et al. "Monitoring and Early Warning for Internet Worms" (Oct. 2003) 10th ACM Conference on Computer and Communications Security (CCS'03) (10 pages).
"Spamming Botnets: Signatures and Characteristics" Xie et al; ACM SIGCOMM. Settle. WA; Aug. 2008; 12 pages (Year: 2008).
Kristoff, "Botnets, Detection and Mitigation: DNS-Based Techniques," NU Security Day (2005) 23 pages, www.it.northwesterd.edu/bin/docs/bots_Kristoff_jul05.ppt.

* cited by examiner

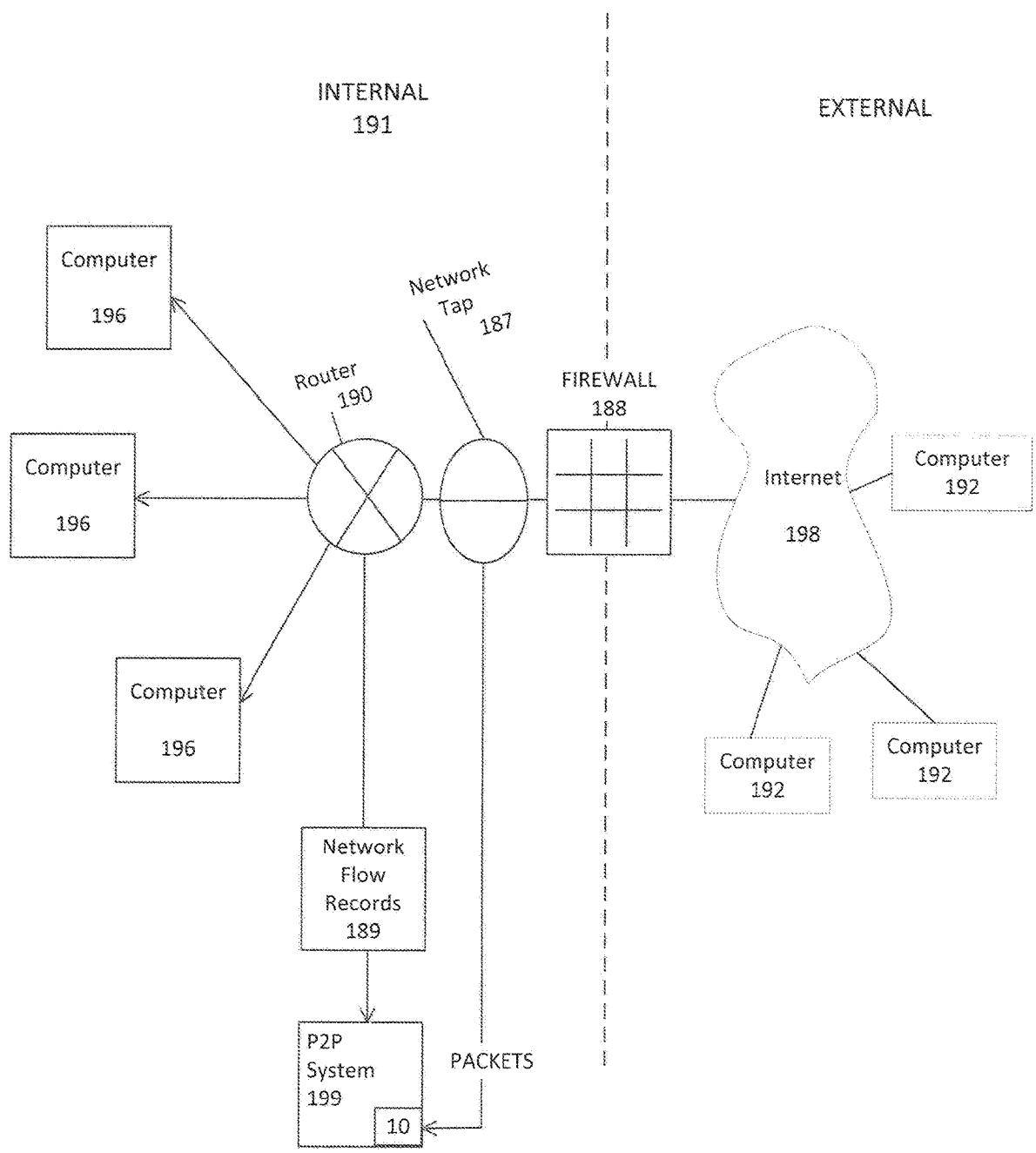

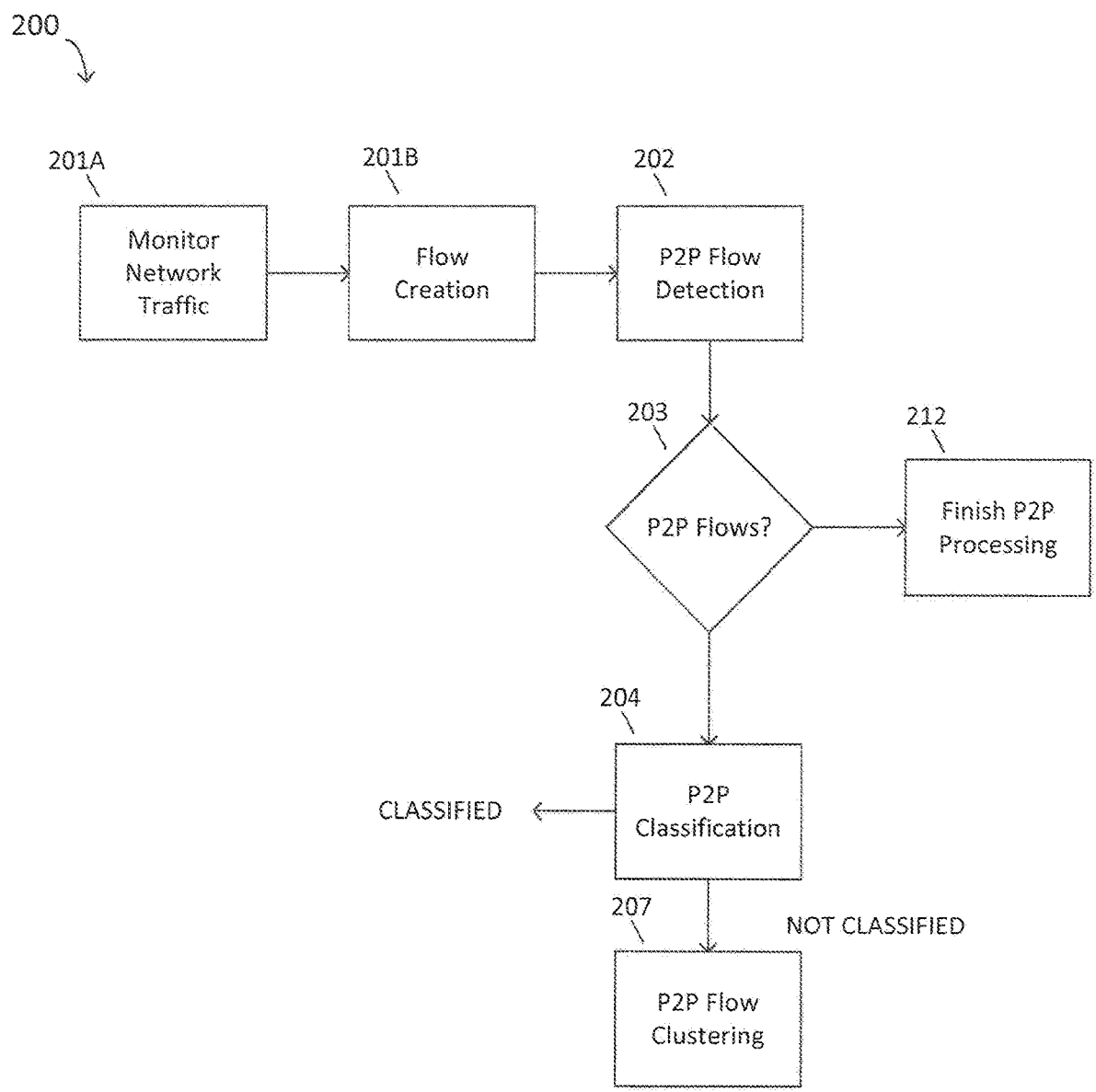

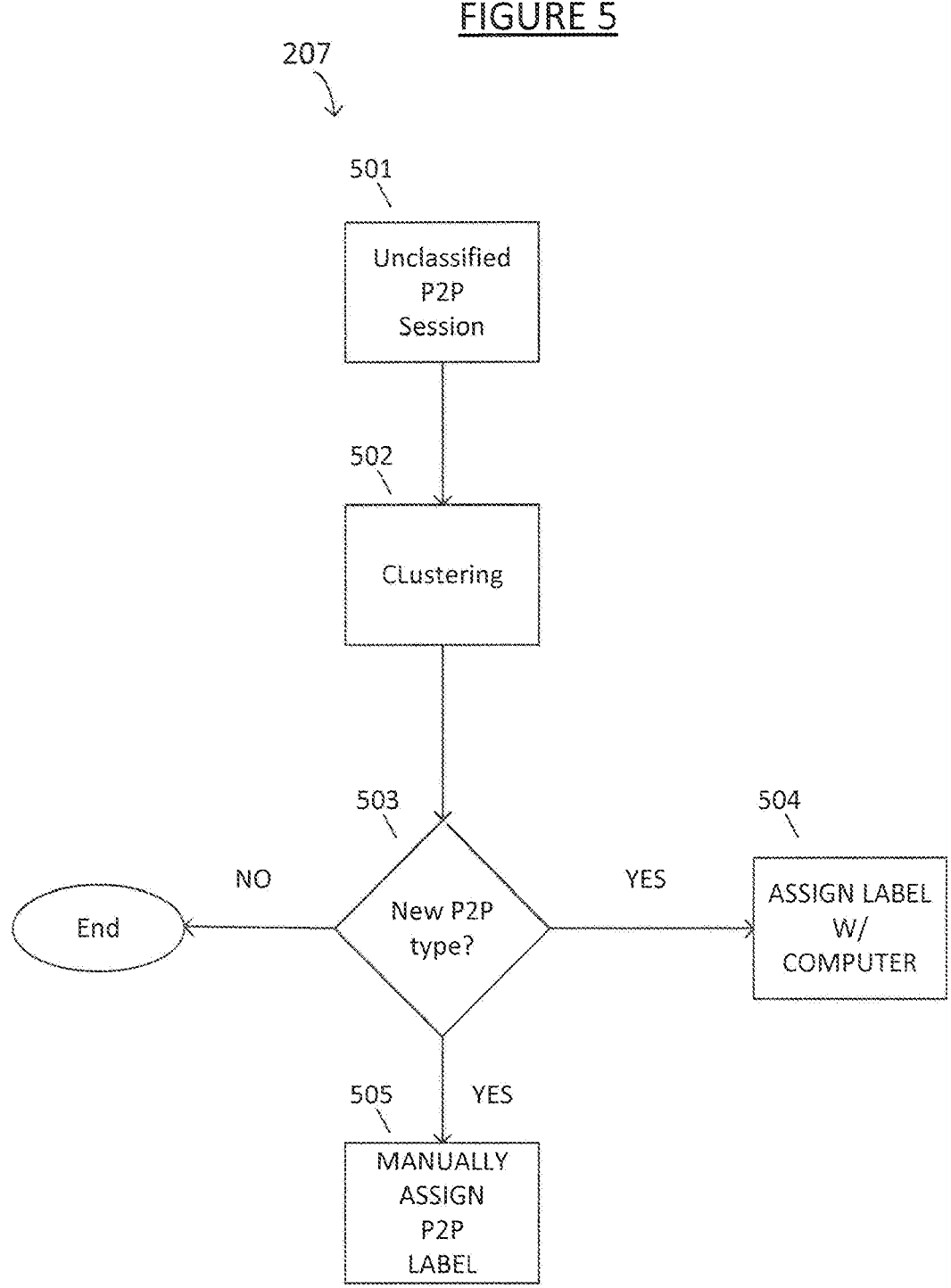

METHODS AND SYSTEMS FOR NETWORK FLOW ANALYSIS

CROSS-REFERENCE TO RELATED APPLICATIONS

This application claims the benefit of U.S. Provisional Application No. 61/693,607, filed Aug. 27, 2012, which is incorporated by reference in its entirety.

BRIEF DESCRIPTION OF THE DRAWINGS

FIG. 1A depicts a network, according to an embodiment of the invention.

FIG. 2 depicts a flow detection and classification process, according to an embodiment of the invention.

FIG. 5 depicts a flow clustering process, according to an embodiment of the invention.

DETAILED DESCRIPTION OF SEVERAL EMBODIMENTS

Figure 1B:
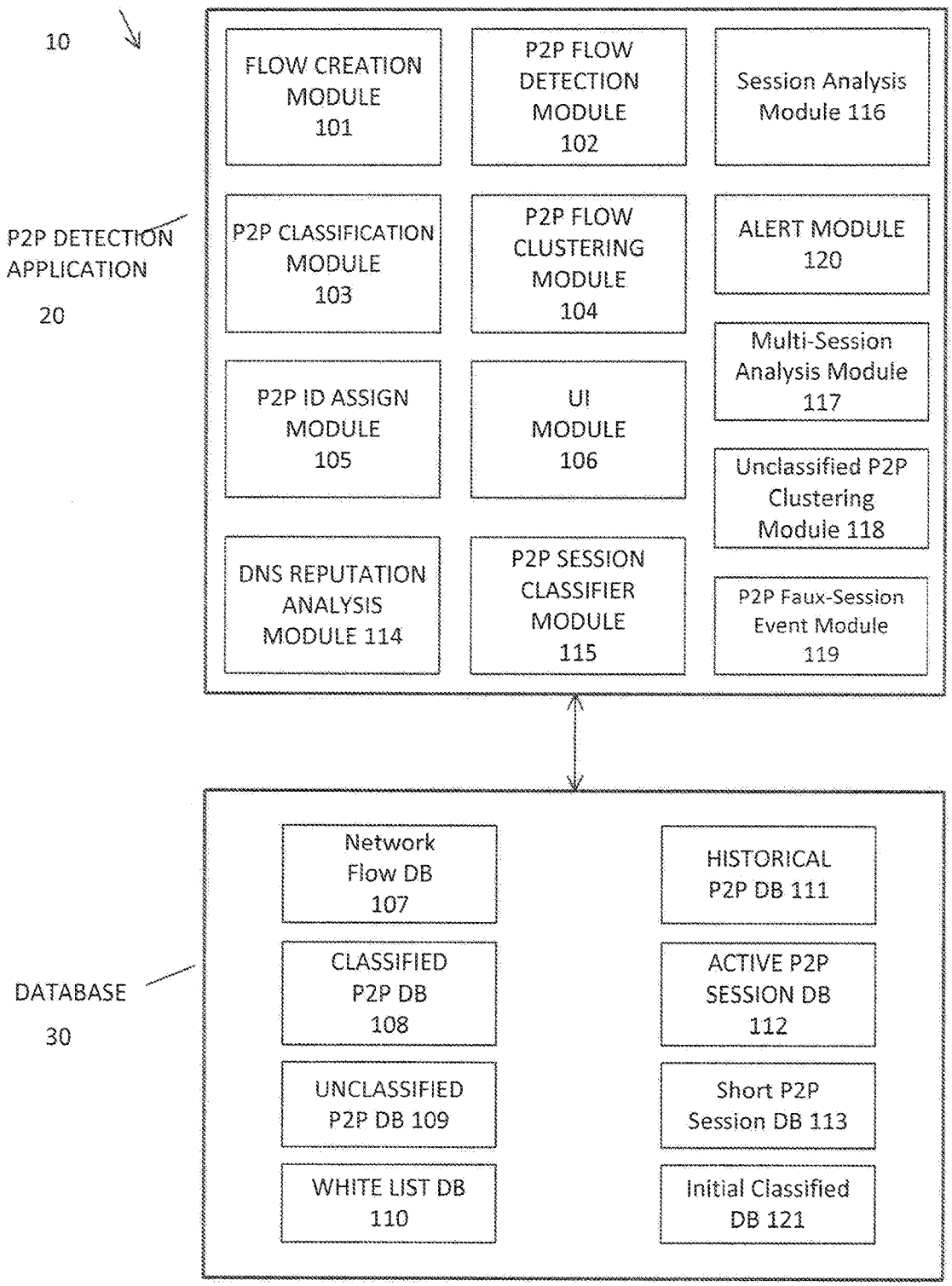
FIG. 1B depicts a flow detection and classification system, according to an embodiment of the invention.

Systems and methods described herein may detect and/or identify peer to peer (P2P) network flows. P2P flows may be used by networked computers for many purposes, comprising file distribution, media streaming, and communication. However, P2P software may also be malware. For example, botnets (collections of compromised computers networked together) may use P2P software to compromise computers. For example, P2P software may be used for botnet command and control infrastructure, allowing commands to be sent to compromised computers commanding them to take actions, such as, but not limited to: starting a distributed denial of service (DDoS) against a third party; scanning for possible additional victims; or extracting information and returning the information to the botmaster; or any combination thereof. A malware application may be surreptitiously installed on a computer and create a P2P connection to the botnet. Other types of undesired and/or malicious P2P software may also exist and may enable data theft or sabotage.

As will be described in greater detail below, systems and methods described herein may enable detection, classification, or blocking, or any combination thereof, of P2P network traffic. P2P flows may be observed in real time, classified as previously observed known applications if known, and/or identified if unknown.

The systems and methods described herein may use one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant art, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

The systems and methods described herein may monitor and/or analyze data flowing through one or more networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via WiFi, WiMax, or other wireless connection). Connections between computers may use any protocols, comprising connection oriented protocols such as, but not limited to, Transmission Control Protocol (TCP) or connectionless protocols such as, but not limited to, User Datagram Protocol (IMP). Any connection through which at least two computers may exchange data ma be the basis of a network.

FIG. 1A depicts an example system 100 according to an embodiment of the invention. This figures illustrates an internal network 191 and an external network (e.g., the Internet 198), separated, for example, by a firewall 188. One or more computers 196 may be in communication with one another via an internal network 191. Clients may be connected to a router 190, which may be capable of generating network flow records 189 (e.g., NetFlow records, which is a network protocol developed by Cisco for collecting IP traffic information). The network flow records may be exported from the router 190 to the P2P system 199. Alternatively, a network tap 187 may be used to replicate all packets transiting from the router to the external network, and these packets may be sent to the P2P system 199, which may generate a flow representation of the data. The computers 196 may also be in communication with external computers (e.g., with Internet Protocols (IPs) 192) via a network (e.g., Internet 198). A peer to peer system 199 (for example, hardware and/or software enabling monitoring of P2P activities) may be in communication with one or more of the computers 196. As will be described in greater detail below, the P2P system 199 may comprise a flow detection and classification system 10 for identifying and/or classifying P2P sessions.

For clarification purposes, a network flow, a P2P flow, and a P2P session are herein defined, according to an embodiment. A network flow may refer to a one-way or two-way network flow record of the communications between two hosts and/or IP addresses. The information contained in a flow record may comprise, for example: IP Address of Host 1; IP Address of Host 2; IP Protocol (TCP, UDP, etc.); Host 1 Port; Host 2 Port; Host 1 Packets; Host 2 Packets; Host 1 Octets (bytes); Host 2 Octets; Start Time; or End Time; or any combination thereof. This information may be obtained using various methods, comprising: packet capture and/or a flow standard (e.g., Cisco's NetFlow, an advanced flow record format).

Packet capture may be done by observing all packets traversing a network. A network flow record containing information such as that set forth above may be constructed by extracting the information from each packet observed and updating a flow table until an end of flow is observed. Examples of end of flow conditions may comprise: a TCP connection termination as determined by a TCP Finish (FIN) or TCP Reset (RST) flag; a period of time exceeding a somewhat arbitrary quiet time timeout, which may force an end of flow condition (e.g., may be used for UDP connections and/or TCP connections); or a period of time exceeding a somewhat arbitrary timeout to force a flow record to be created on a long duration flow that is still active (e.g., this may allow monitoring software to be aware that a long duration flow is occurring before it terminates).

Various flow standards may comprise Cisco's NetFlow system, which may collect information similar to that collected using packet capture and various flow standards, as described below, NetFlow records may be unidirectional reports from routers and/or other network infrastructure devices that may provide the following information, for example: source and destination IP address, the source and destination port, the protocol, the number of packets and octets sent, or a time stamp, or any combination thereof. In an embodiment, a flow stitching approach may be used to identify a bi-directional representation of communications between two devices when bi-directional flows are not available. In one embodiment, unilateral records associated with a communications session may be merged together to provide a hi-directional record of the communications. However, it should be noted that this is not required, as a similar analysis could be performed with unidirectional records.

Various flow standards may also comprise advanced flow record formats, such as Internet Protocol Flow information Export (IPFIX) extensions, which may provide bi-directional network flow records as described above.

A P2P flow may be a network flow that has been determined, to be likely to be associated with a P2P application, such as BitTorrent.

A P2P session may be a collection of related flows that may be likely to be based on the same P2P application involving a monitored or inside device, and multiple external devices. For example, a P2P Session may consist of a number (e.g., a few to hundreds or more) of flows that have similar characteristics and occur within the same epoch or overlap multiple epochs.

FIG. 1B depicts the flow detection and classification system 10, according to an embodiment of the invention. The flow detection and classification system 10 may perform some or all of the processes described below with respect to FIGS. 2-5. The flow detection and classification system 10 may comprise a P2P detection application 20 and/or databases 30. In the example of FIG. 1B, a P2P detection application 20 may be in communication with a database 30. The P2P detection application 20 may analyze inbound and/or outbound traffic. The P2P detection application 20 may comprise in-line monitoring and/or out-of-band monitoring. In-line monitoring may analyze traffic flowing between the P2P detection application 20 and network 198 (e.g., the P2P traffic passes through the monitoring system). Out-of-band monitoring may monitor traffic traversing a gateway between an internal network (e.g., corporation X's network) and an external network (e.g., the Internet). (Note that an external network may be defined by political, organizational, or geographic boundaries, or any combination thereof$_{[ij1]}$.)

The P2P detection application 20 may comprise one or more modules for analyzing the traffic. For example, the P2P detection application 20 may comprise: a flow creation module 101, a P2P flow detection module 102, a P2P classification module 103, a P2P flow clustering module 104, a P2P identifier assignment module 105, a user interface (UI) module 106, a domain name system (DNS) reputation analysis module 114, a P2P session classifier module 115, a session analysis module 116, a multi-session analysis module 117, an unclassified P2P clustering module 118, a P2P faux-session creation module 119, or an alert module 120, or any combination thereof. The database 30 may be physically and/or logically divided into one or more specific databases, comprising: a network flow database 107, a classified P2P database 108, an unclassified P2P database 109, a white list database 110, a historical. P2P database 11 an active P2P session database 112, an initial classified database 121, or a short P2P session database 113, or any combination thereof. Functions which may be performed by these P2P detection application 20 modules and/or data that may be stored in the database 30 are described in greater detail below with respect to FIGS. 2-5. It should be noted that the various functions of the modules and the various storage capabilities of the databases may be combined and/or broken up, in some embodiments.

FIG. 2 depicts a flow detection and classification process 100 according to an embodiment of the invention. In 201A, network traffic may be monitored. In 201B, packet information for the network traffic may be used to create network flow data using flow creation module 101. The flow creation module 101 may generate flow data, for example by using: a network router, packet capture, or a flow standard, or any combination thereof. Network flow data may comprise one or more streams of network flows describing the traffic on the network. As noted above, this data may be generated according to any flow standard (e.g., a NetFlow format generated by a Cisco or other router, or an Internet Engineering Task Force (IETF) flow standard (e.g., IPFIX)), and/or may be generated directly from packet captures into a flow format characterized by a 5-tuple that may comprise: a source and destination IP address, a source and destination packet number, or a protocol of the flow, or any combination thereof. The generated flow data may be sent to a P2P flow detection module 102 in 202.

In 203, the flow detection module 102 may determine whether a flow is a P2P flow. An example process for determining whether a flow is a P2P flow is described in FIG. 3. For example, a similar collection of flows can be found within a prescribed time period. For example, if more than a few (e.g., 5) flows are observed in a five minute period that involve hi-port to hi-port communication, all to outside devices, with no DNS lookup observed, and using the same protocol these five or more flows may be identified as P2P flows comprising part of a P2P session.

Figure 3:
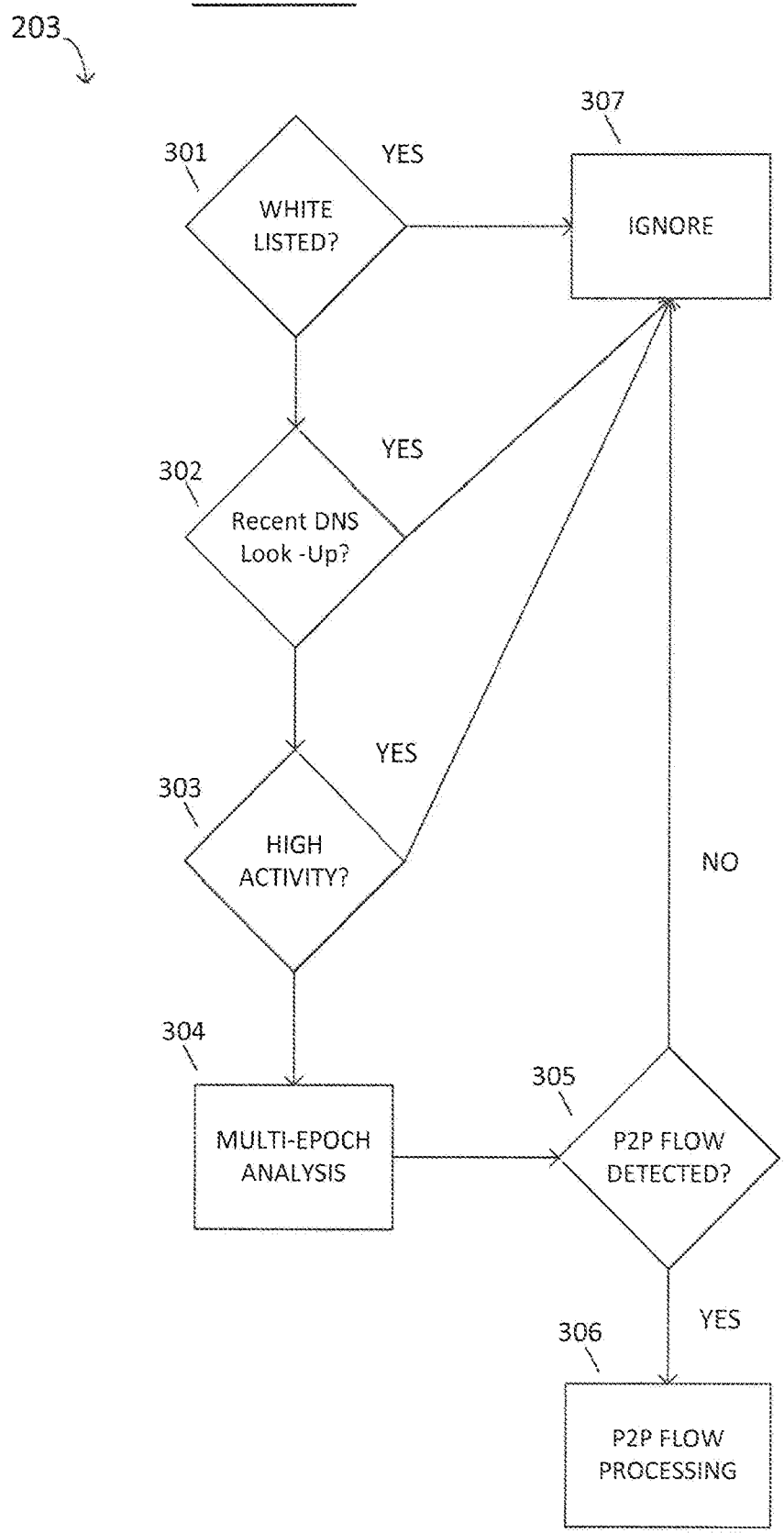
FIG. 3 depicts a flow detection process, according to an embodiment of the invention.

FIG. 3 depicts an example process 203 for determining whether a flow is a P2P flow, according to an embodiment of the invention. In 301, the P2P detection application 20 may determine whether a flow has been white listed by checking a white list database 110, which may comprise a list of flows that are white listed. White listed flows may comprise flows that are specifically excluded from monitoring. For example, flows from certain internal hosts may be ignored for a reason determined by a user (e.g., not wanting to monitor Web servers for P2P traffic as this traffic may be have very high volume). If a flow is found in the white list database 110, it may be ignored in 307.

If the flow is not found in the white list database 110, in 302, the P2P detection application 20 may determine whether a recent DNS lookup has been done locally for a remote device associated with the flow. To do so, the P2P detection application 20 may consult the network flow database 107, which may contain DNS lookup records. If a recent DNS lookup has occurred, the flow may be ignored by the flow detection module 102 in 307. In some embodiments, ignored flows may be passed to an external DNS reputation analysis module 114 for farther processing.

If no recent DNS lookup has occurred, in 303, the P2P detection application 20 may determine whether the flow involves a high activity external host or domain. High activity may be determined statically, for example by using a list of the most active domains from Alexa (e.g., or a similar Internet service company that identified the most accessed Web sites) or consulting a list of high activity domains in the network flow database 107, and/or dynamically, for example by tracking how many internal hosts interact with an external host or domain. If the flow relates to a high activity external host or domain, it may be ignored in 307, As noted above, in some embodiments, ignored flows may be passed to an external DNS reputation analysis module 114 for further processing.

The filters described above are examples only, and other filters may be used additionally or alternatively, such as, but not limited to: ignoring all but P2P high port—high port (HI-HI) flows (for example, wherein ports 1024 and above are high ports) and/or ignoring all but User Datagram Protocol (UDP) traffic.

Flows that are not filtered out may be analyzed with a multi-epoch analysis process in 304. Flows may be iteratively processed, starting with a shortest epoch and progressing through to a longest epoch. An epoch may be a starting point in $time_{[ij2]}$ from which time is measured.

Epochs may be used to maintain a time reference as a single number for ease of computation. Otherwise, depending on the granularity of time desired, every point in time would have to be stored with some of or all of the components of the time hierarchy. For example, in an embodiment, a shortest epoch may be labeled epoch[0] and may be one minute in length, and a longest epoch may be labeled epoch[N] and may be 24 hours in length. Epochs may be any size, and any total number of epochs may be possible.

For example, for a shortest epoch, flows that are received during a most recent epoch may be processed. The process may run once per the shortest epoch. Each flow may be attributed to an internal host involved with the flow, and flows may be grouped according to various flow features. (More information on grouping flows is described with respect to FIG. 4 below.) For example, P2P flows may be: HI-HI flows, flows without associated DNS traffic, or flows to low activity external hosts, or any combination thereof. In 305, P2P flows may be detected. Therefore, if a plurality of flows are detected which each have HI-HI, no DNS, and low activity external host characteristics, the flows may be likely to be P2P flows, and the P2P detection application 20 may identify them as such. A plurality of flows may be grouped together, copied from the network flow database 107, tagged as P2P flows, and/or forwarded for P2P flow processing in 306. Other example groupings may occur based on common port use, number of flows, flow types, flow rates, and/or other criteria. If a flow is not determined to be a P2P flow, it may be ignored in 307.

As noted above, in some embodiments, ignored flows may be passed to an external DNS reputation analysis module 114 for further processing. For example, if enhanced flow data is available from some source, such as NetFlow v9, IPFIX, or locally generated flow details (e.g., payload information), additional processing may be performed to create features or use in classifying the flows. For example, payload analysis may be able to identify a certain protocol, a malware signature, or a malware packer (e.g., a way to hide itself) that certain malware is using. For example, by analyzing the payload contents, it can be determine whether the payload has been encrypted, which may provide a new feature for discriminating between flows.

In addition, more detailed analysis may be performed to identify behavior that may be used to identify activities associated with malware. For example, having packet payload available for deep packet inspection along with the flow data allows examination of the contents of the information exchanged between the two hosts. This may allow detection of malware being transferred by a P2P application such as BitTorrent through standard pattern matching techniques (e.g., signature analysis) used by intrusion detection and/or prevention systems and various types of anti-virus technologies. This information may assist in classifying the flows as benign or malicious. Other examples of information that can be derived from packet payloads comprise; identifying a large increase in outbound emails, indicative of a system that has been compromised and is being used for spamming purposes; and/or detecting repeated requests to the same destination IP, which is indicative of a denial of service (DoS) attack. Observing spam or a DoS attack from a host also using an unknown P2P flow may assist in determining if the P2P is related to malware.

With respect to epochs, in the case of subsequent longer epochs, available flows from the network flow database 107 may be subjected to processing such as that described with respect to the shortest epoch, but in an increased time window. This may allow for detection of slower P2P applications. For example, a second iteration may process the last ten minutes of flows, a third iteration may process the last sixty minutes of flows, and so on. During each iteration, if P2P flows are identified, they may be tagged with an identifier of the iteration in which they were found and forwarded to P2P flow processing (306). If flows in the network flow database 107 are older than the longest epoch examined by the P2P detection application 20, they may be ignored and/or purged as not being P2P flows.

In some embodiments, different weightings and thresholds may be used in the classified P2P database 108 for each of the epochs. For example, weightings and thresholds for classification of a flow as a P2P flow may be different for a short epoch as opposed to a long epoch. This may be done to focus the detection of the P2P flows based on the level of activity. Some P2P flows generate a large number of flows in a very short period of time. The shortest epoch may be set up to detect these noisy (e.g., high activity, high volume) P2P flows, and thus a high flow threshold may be set (e.g., 25 flows in 5 minutes). The longer epochs may be intended to detect stealthy P2P flows that have very few flows per day. As such, the number of flows required to trigger analysis may be set much lower (e.g., 3 flows in 24 hours).

Returning to FIG. 2, when the P2P flow detection module 202 has processed a flow, the P2P detection application 20 may know whether the flow is a P2P flow or not. If the flow is not determined to be a P2P flow in 203, the P2P processing for that flow may end in 212. If the flow is determined to be a P2P flow in 203, the flow may be classified by a P2P classification module 103 in 204. An example process for classifying a P2P flow is described in FIG. 4.

Figure 4:
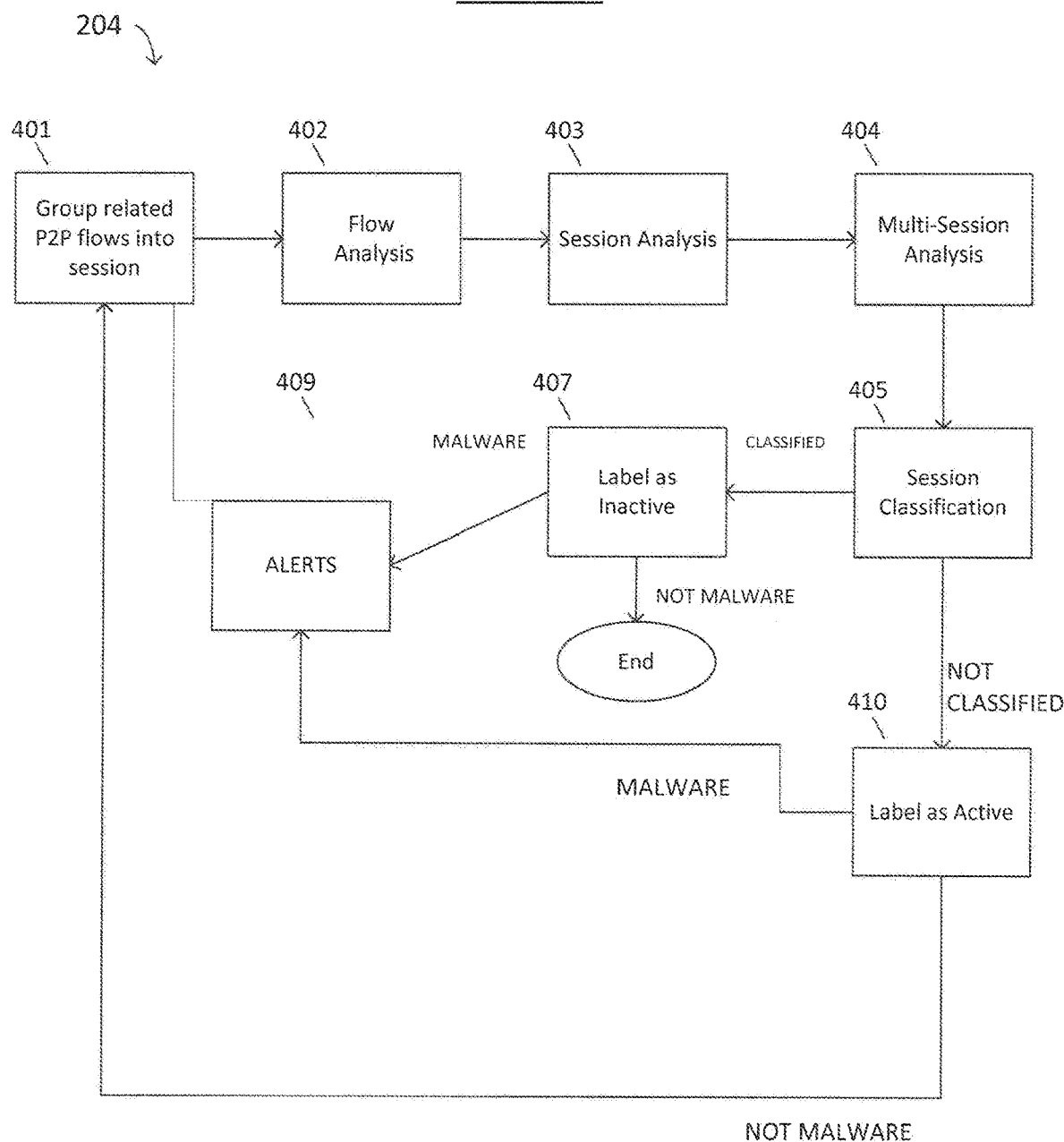
FIG. 4 depicts a flow classification process, according to an embodiment of the invention.

FIG. 4 depicts a flow classification process 204, according to an embodiment of the invention. As described above, a flow may be detected as a P2P flow. A P2P flow may be input into a P2P classification module 103. P2P flows may be related to one another because they are part of the same P2P session used by the P2P application. In 401, flows may be grouped into related flows comprising a session. This may create a data set comprising P2P sessions that span multiple epochs. If the P2P session has an insufficient traffic rate (e.g., a low number of flows) to be analyzed by the shortest epoch, it may be analyzed using a longer epoch.

In 402, P2P flows and/or merged P2P flows may be analyzed. Enhanced flow data may be used in 402 to provide additional information to be used in classifying the flows. Individual flow features of the flows in a session may be generated. Flow features may comprise: payload out, payload in, packets out, packets in, protocols (e.g., TCP (a Boolean indicator), UDP (a Boolean indicator), ICMP (a Boolean indicator)), high port—high port (a Boolean indicator), high port—low port (a Boolean indicator), low port—low port (a Boolean indicator), common internal TCP control port (a Boolean indicator), common external TCP control port (a Boolean indicator), common internal UDP control port (a Boolean indicator), common external UDP control port (a Boolean indicator), flows per second, average packet rate (packets sent/flow duration, occurrences of matching packet count and payload length exchanges, percent of flows with matching packet count and payload length exchanges; distance to remote IP addresses (e.g., percent by distance, in ranges or buckets (e.g., <1000 miles, 1000-2000 miles, 2000-4000 miles, etc.), content of remote IP addresses (e.g., % by continent), percent of IP addresses located in local host countries, percent of flows using TCP, percent of flows using UDP, percentage of fixed port flows, or percentage of bidirectional flows, or any combination thereof.

The flow features found in 402 may be used in 403 to analyze sessions using a session analysis module 116. The session analysis in 403 may determine how the associated flows describe a session using features that are useful in distinguishing one P2P flow from another. These features may comprise: session flow features, geographic features, NXDOMAIN features, or other features, or any combination thereof.

The session flow features may relate to data transfer types and/or flow rates representative of how the P2P flows describe a related P2P session. The type of data that is being transferred and/or the type of activity that is being performed may affect the P2P session features. For example, some P2P flows use the P2P network primarily to search for a particular file, and then exchange the file in a one-to-one direct transfer. Other P2P applications may download a file in pieces from multiple locations. To that end, session flow features may describe how files and information are exchanged. Session features may comprise: average active flows, maximum active simultaneous flows, maximum external hosts, total flows, session duration, average flow duration, maximum simultaneous data transfers, one to one transfers, many to one transfers, ratio of one to one transfers to total transfers, number of persistent flows, percent of persistent flows, percent of one-way flows (e.g., failures to connect), percent of low traffic flows, percent of medium traffic flows, percent of high traffic flows, possible voice session, possible internet radio session, possible audio share session (e.g., Spotify), or possible video share session (e.g., Peercasting, Peer Distributed Transfer Protocol, P2PTV), or any combination thereof. Some or all of these features may be represented as a probability or measurement that indicates the likelihood that a given session matches the session features.

The geographic features of the P2P flows may be related to geographical dispersion of hosts involved in the related P2P session. For example, an IP of a host may be passed to a geographic location database or service or the location of a host may be determined in some other way. When locations of hosts are known, a P2P flow may be classified used on percentages of connections that are country local, continent local, and/or meet other geography based criteria. This may aid in identifying a P2P flow because some P2P applications may be "connection distance aware," and may therefore attempt to connect to geographically closest peers for performance optimization. For example, many P2P audio/video peercasting programs may be connection distance aware. Classifying a P2P flow based on geography may allow Inc P2P detection application 20 to identify P2P sessions that may be specifically intended to be used in a single country or region and identify P2P sessions with no geographic limitations, P2P sessions may be region specific due to license restrictions or due to their use by malware as a targeted attack on a specific region, for example. Geographic features may comprise: geographic dispersion: same continent, geographic dispersion: same country, or geographic dispersion: same locale, or any combination thereof. Some or all of these features may be represented as a probability or measurement that indicates the likelihood that a given session matches the session features. The geographic features may be passed to a P2P session classifier module 115 (described below).

The NXDOMAIN features may be the number of external devices which return a NXDOMAIN result to a reverse DNS lookup as compared to the total number of external devices. This may help determine some characteristics of other peers in the P2P session. For example, a protocol such as BitTorrent may have a very high percentage of home users on a public access internet service provider (ISP). Because an ISP may respond with a valid DNS result to a reverse lookup, there may be a very low ratio of NXDOMAIN responses with a typical Bifforrent P2P session. Other commercial P2P applications that may be semi-centralized may make connections to a number of hosts that are not advertised by DNS and hence may return NXDOMAIN to a reverse lookup request.

Additional features may be also be generated by the session analysis in 403. For example, traffic rates, payload rates, ports used, and/or payload from the beginning of a flow may be features that can identify a P2P session associated with a P2P flow.

In 404, the P2P flows may be analyzed by a multi-session analysis module 117, which may analyze how sessions relate to each other. Features may be generated that may describe relationships between multiple P2P sessions and hosts involved with P2P flows related to the P2P sessions. For example, a user making a number of Skype calls throughout the day may create multiple P2P sessions (assuming a short "dead time" between calls) that have some common characteristics and some differing characteristics. Common characteristics may comprise use of a fixed port for each of the different session, and may commonly interact with several external hosts repeatedly throughout the day. The time interval between sessions may be variable, and generally, in the case of a business, often only during normal working house. Another user may make use of a private network of hosts, indicated by a high number of repeated connections, and make regularly scheduled sessions. Frequency analysis of the sessions of this user may provide a very different result from the Skype example.

As noted in the examples above, multi-session analysis in 404 may involve connection history analysis, wherein the P2P detection application 20 may analyze hosts involved in a P2P session and determine how the hosts have been involved in previous P2P sessions. Multi-session analysis in 404 may also involve private P2P network detection, for example detecting whether a public network is used for initial connection and/or as a backup to a primary private network (public-private networks) and/or detecting fully private networks wherein all communications are private.

Multi-session analysis in 404 may also involve session classification biasing, wherein previously classified P2P sessions involving the same internal host as a P2P session being analyzed and closely matching the characteristics of the P2P session being analyzed may provide a bias towards classifying the P2P session. A historical P2P database lit may store previous P2P session information for use in this analysis and may be accessed during the multi-session analysis in 404.

In the connection history analysis of the multi-session analysis in 404, a number of connection features may provide insight into the connection relationships of a P2P session and may be useful for distinguishing one P2P session from another. For example, connection features relevant to a connection history analysis may comprise a first connection (indicating that a connection to an external host is the first connection between an internal host and the external host), a solo connection (indicating that one and only one internal host has connected to the external host, also a first connection by definition), a rare connection (indicating that a low percentage of internal hosts have connected to the external host), a repeated connection (indicating that multiple P2P sessions have repeatedly connected to the external host), and/or a list of all external IP addresses involved in a P2P session (for example as a discreet list or in a compact form of representative storage such as a bloom filter).

For example, P2P sessions may be classified in a number of different ways. One approach is to identify the openness of the P2P session to determine if it is a public or private network. Analysis of the connections made from the local device to remote devices during a P2P session, as well as across multiple P2P sessions allows segregation of P2P sessions that are public from those that are private. A public P2P session, such as BitTorrent, may be commonly characterized by very low repeated use of external devices and/or very low overlap of the external devices contacted between different P2P session from the same local host. This may occur because of how BitTorrent operates. When a user identifies a file that the user wishes to download, the BitTorrent session may initiate the download by connecting with one or more trackers, which may identify a P2P swarm ("swarm 1") which may comprise external devices that contain either the complete file ("seed computers") or portions of the file. The local host may then join swarm 1 and download the file in many small fragments from the hosts in swarm 1. In addition, other hosts may detect that the local host now has pieces of the file available and may connect to the local host, which may send the requested pieces to other devices. As a result, a large number of connections may be created during a BitTorrent P2P session, and the common element, that may connect these devices may be the file being exchanged. A subsequent BitTorrent session to obtain a different file may be connected to a different swarm ("swarm 2") for the different file. There may be a few hosts (e.g., devices) in common between swarm 1 and swarm 2, and the percentage of total connections in each session may be very low (e.g., less than 1%). Because the hosts are widely dispersed, there will be very little commonality in, for example, external device addresses and/or Class C address blocks (e.g., first 24 bits of IP address).

Conversely, in a private P2P session, there is a much higher likelihood of commonality (e.g., repeated connections) with external devices because the session has both a smaller set of devices in total, and may have a specific purpose that has an affinity for repeated connections. For example, with Skype, users may be performing a similar task from one session to another (e.g., placing a Skype call). Thus, the Skype sessions access a Skype server offering the service during the start of the sessions, and then makes connections through other Skype servers or distributed super-nodes. The servers may occupy a range of addresses. This may make exact address matches less likely, but examining the address ranges by Class C address blocks may show a high number of repeated connections to the same Class C address block from one session to another from the same host. Other internal hosts using the same service may show similar characteristics, and the internal hosts may have a high degree of commonality in their connections.

The connection history analysis may comprise the following attributes: first connection/repeat connection (single internal device); first connection (multiple internal devices); solo connection; or rare connection; or any combination thereof.

The first connection/repeat connection (single internal device) may identify the initial connection between a single internal device and an external IP address. This may allow determination of subsequent repeat connections. The first connection (multiple internal devices) may identify the first time connection to an external IP address from any internal device. This may be used to aid identification of the root cause of infection by malware by providing identification of the original external IP address involved. The solo connection may identify an external IP address that has been contacted by one and only one internal device. A new solo connection may be, by definition, also a first connection. This may be used an one measure of commonality between members of P2P swarms (e.g., % of solo and % of rare connections). The rare connection may indicate an external IP address that has been used by more than one internal device, but is not widely used by internal devices. The threshold for a rare connection may be determined either manually or algorithmically, depending on the number of internal devices on the network. For example, a manual threshold may dictate that a rare connection is one that has more than one internal connection, but not more than the maximum of either 2 or 0.05% of the total number of internal hosts.

The multi-session analysis in 404 may also examine P2P sessions to determine whether the related P2P networks are public or private. This may be done, for example, because public networks may be susceptible to malware uses and/or may allow setup of a private sub-network of the public network. Private P2P network detection may create features for the P2P flow comprising: private network, public network to private network (sub-network, same protocol), or public network to private network (sub-network, different protocol), or any combination thereof. Detection of private networks and/or transitions between public and private networks may be enabled by observing and/or detecting hosts involved in a P2P session. For example, public networks may be characterized by a rapid change of IP addresses involved in a P2P session as users search for and/or connect to various other users to upload and/or download data. Some external hosts may tend to be static as the first external hosts to which an internal host may connect, or in the case of P2P flows using a hybrid-decentralized architecture, part of a P2P infrastructure (for example a Skype super-node). Private networks may tend to make repeated use of the same external hosts, as a private network may be built for a specific application or task. Such a private network may be tied to a proprietary service (for example Spotify) or to a piece of malware that may use P2P for command and control of remote computers. In some cases, an identical set of external hosts may be used for multiple P2P sessions. In one example, to determine whether a private network is being used, a P2P session associated with an internal host may be tracked over time against other P2P sessions associated with the same host. External hosts used in each session may be compared with hosts in other sessions to identify high overlap in the external hosts active in the various sessions. In cases with high overlap. P2P sessions may be tagged as private network sessions. Over time, external hosts may change as external participants join and/or leave the private network. In another example, the set of hosts used in a session may be controlled by a connection list, which may be updated periodically. A transition from a public network to a private sub-network may be detected through detection of a period of time wherein a P2P session operates on a public network followed by detection of an extended period of time wherein the P2P session operates on a private network. Detecting a change in private network participants may be done by detecting an exchange of information in a P2P session prior to a change in participants in subsequent P2P sessions.

The multi-session analysis in 404 may also examine P2P sessions by comparing them with previously classified sessions associated with the same host. For example, many P2P applications may use the same control port(s) in all P2P sessions. TCP and/or UDP control ports used in a P2P session may be compared with those used in previously observed P2P sessions to determine whether there is a match. A match may increase confidence that the P2P session being analyzed is a session of the same P2P application which generated the previously observed P2P sessions. A feature may be created indicating a bias for this P2P session if a match is detected, or the feature may be left null in the case of no match. The features generated by any of the above multi-session analysis tests and/or other tests may be passed to a P2P session classifier module 115.

The information from the flow analysis (402), the session analysis (403), or the multi-session analysis (404), or any combination thereof, may be passed to a P2P session classifier module 115 in 405, which may attempt to match a current P2P session with previously observed and labeled P2P flows in a classified or labeled P2P database 108. If a match is found, the current P2P session may be labeled and may be determined to be benign or malicious based on the characteristics of the matching P2P flow in the classified P2P database 108. A training data set may be created with the features of the P2P session, and various types of machine learning algorithms may be trained for P2P session classification. For example, a decision tree may be used to make a determination of "benign" or "malicious" for a P2P session. A decision tree may also be used to identify the root P2P protocol used by a P2P flow (e.g., eMule, BitTorrent). More detailed results may be generated using more complex machine learning. For example, identifying a particular P2P flow using a modified version of a root P2P protocol may be performed using a support vector machine. These are provided as examples only, and those of ordinary skill in the art will appreciate that P2P sessions may be classified using a variety of techniques.

Using the information analysis from the flow analysis (402), the session analysis (403), or the multi-session analysis (404), or any combination thereof, in 405 the P2P session classifier module 115 may have enough information to classify some P2P sessions, and may be unable to classify others if not enough features are known. The P2P classifier module 115 may use other classification processes, such as, for example, another white list and/or a malware check. This white list may determine whether a session is an authorized P2P session by reviewing a list of P2P flows identified by users. For example, flows associated with authorized P2P software, such as Spotify and/or Skype, may be white listed.

If the P2P session was able to be classified in 405 using any combination of the above-described information, the P2P session may be labeled inactive and/or complete in 407. If it was determined in 405 that the P2P session is associated with malware, in 409, the P2P detection application 20 may generate alerts with the alert module 120, which alerts may be sent to a user and/or a network security infrastructure. Completed classified sessions, whether determined to be malware or not, may be added to a historical P2P database so that they may be used for comparison with future P2P sessions as described above.

If a P2P session was not able to be classified in 405 using any combination of the above-described information, the P2P session may be labeled active in 410. This may signify that the P2P session has not terminated. That is, more flows in a subsequent epoch are expected as there was no determination of an "end of session" as determined by a timeout in the current epoch. The timeout may be determined by a fixed time without additional flows if the P2P detection application 20 is generating the flows from packet captures by some measure based on the flow forwarding timeout on a router. Of course, the timeout may also be determined by other methods.

It should be noted that when a P2P session is active, it may span many epochs. Detection may be done as early in the flow as possible, while still continuing to process the flow as active. This may be useful because some malware P2P sessions continue indefinitely meaning detection needs to occur before the end of the session.

Unclassified sessions may be added to an active P2P session database 112. As with inactive P2P sessions, if the active P2P session is found to be associated with malware in 405, in 409 the P2P detection application 20 may generate alerts with the alert module 120, which alerts may be sent to a user and/or a network security infrastructure.

If a P2P session was labeled as active in 410, and not determined to be malware in 405, the P2P session may be added to an active P2P session database 112 as an unclassified active P2P session and fed back into 401, where the P2P session may be grouped with newly received P2P flows (e.g., as new epochs are tested as described above) and then reprocessed through 405. This may occur multiple times until the P2P session is complete.

Some P2P sessions may have an insufficient number of P2P flows to be classified by the P2P detection application 20 as an individual session. The number of P2P flows required to be classified may be determined based on observation and determination of a statistically significant number of flows. This may vary and may be determined based on, for example: the P2P flow characteristics, other network traffic characteristics, or the end users tolerance for errors versus higher sensitivity, or any combination thereof. For example, if a P2P session has ended and does not have enough P2P flows to have been classified, it may be added to a short active P2P session database 113, and may be merged with other similar short active P2P sessions to create P2P faux-sessions. A faux-session may be processed in the same manner as a single P2P session, as described above in 401-405. Sessions may be merged using a variety of approaches. For example, all P2P sessions related to a single host may be merged, and/or sessions may be combined based on common characteristics determined during initial processing described above (e.g., common control ports or other features may be used to identify common characteristics). The creation of faux-sessions may also enable identification of slow P2P flows with low flow rates. For example, some P2P flows may attempt to avoid detection by using relatively few flows at any one point in time, such as command and control communications associated with some malware. These flows may be aggregated into faux-sessions for analysis.

Returning to FIG. 2, in 207, unclassified P2P sessions may be stored in an unclassified P2P database and may be clustered by a P2P flow clustering module 104 and clustered P2P identifier assignment module 105. FIG. 5 depicts a flow clustering process 207 which may be performed by one or both of these modules, according to an embodiment of the invention. In the flow clustering process 207, the P2P detection application 20 may identify and group similar unclassified P2P sessions, create a unique classification and/or identifier for the group, and/or update a labeled P2P database 108 with the identity and features that describe the newly classified P2P flow.

In 501, an unclassified P2P session may be detected according to the processes described above and analysis of the detected session may begin. In 502, the unclassified P2P session may be analyzed in an unclassified P2P clustering module 118, which may perform clustering operations of P2P sessions previously observed and stored in an unclassified P2P database 109. Clustering of unclassified P2P sessions may be performed by a number of different methods. For example, a clustering algorithm may be used to create groups of P2P session based on one of several different machine learning techniques such as K-means, hierarchical clustering, or another related clustering algorithms. Those of ordinary skill in the art will appreciate that other methods may be used. The clustering may be done based on similarities among features used to describe the unclassified P2P sessions. In 503, when the P2P detection application 20 determines that a cluster contains a sufficient number of P2P sessions within a prescribed distance threshold, the sessions in the cluster may be designated as a newly classified P2P type and, in 504, the new P2P type may undergo P2P label assignment processing. A cluster that does not contain a sufficient number of P2P sessions may be stored in the unclassified P2P database and await new data for further clustering.

It should be noted that there is no requirement that each P2P session become a member of a cluster. Thus, a P2P session can be unknown or an outlier. One objective is to create clusters of P2P flow and/or sessions that are sufficiently separated from each other such that new P2P sessions fall within the boundary of an existing cluster with a high probability of accuracy or fall in to the area between clusters identified as an un-clustered P2P. If a sufficient number of new unknown P2P flows and/or sessions are observed and have common characteristics associated with the clustering attributes, a new cluster may be created in the space between existing dusters. The distance threshold may define the boundaries of the cluster that insure there is a high probability that individual P2P flows and/or sessions in one cluster are, in fact, members of that cluster and not members of a nearby cluster, or that the individual P2P flows and/or sessions are un-clustered P2P sessions.

The P2P label assignment performed in 504 may automatically assign a P2P label to a newly identified P2P type using a computerized process. In 505, a P2P label for the newly identified P2P types may be assigned manually by a user. An initial classified database 121 may be created by training the P2P detection application 20 with known P2P flows, which may comprise commercial P2P flows such as Skype and Spotify as well as known malware P2P flows. These known P2P entries may be assigned names reflecting commonly known designators for the application and/or tags indicating a benign, unknown, or malicious status.

It should be noted that a classified P2P flow may have a standardized label assigned that is unique to the P2P flow. The standardized label may be changed to a meaningful name through label assignment processing in 505 when the source of the P2P flow is determined. Additional information, such as a DNS entry (which may be obtained through reverse DNS lookups, use of a passive DNS database, and/or WHOIS lookup) may be used to provide additional classification information. For example, a Skype P2P session may contact at least one server operated by Skype as determined via a WHOIS lookup. The name and/or descriptor variables of the Skype server may be inserted into the classified P2P database III in an entry corresponding to the newly labeled P2P session.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the term "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method comprising:
performing processing associated with receiving, with a flow creation module in communication with a computer comprising a database, network flow data;
performing processing associated with identifying, with a peer to peer flow detection module in communication with the computer, and from the network flow data, a first plurality of network flows that together constitute a first peer to peer network communication within the network flow data and a second plurality of network flows that together constitute a second peer to peer network communication within the network flow data;
performing processing associated with detecting, with a peer to peer classification module in communication with the computer, that the first plurality of network flows matches one or more known peer to peer application communications;
responsive to detecting a match for the first plurality of network flows, performing processing associated with labeling, with the peer to peer classification module, the first plurality of network flows with a first label comprising a category identical to the matching one or more known peer to peer application communications;
performing processing associated with detecting, with the peer to peer classification module in communication with the computer, that the second plurality of network flows does not match any of the one or more known peer to peer application communications;
responsive to failing to detect a match for the second plurality of network flows:
 performing processing associated with determining, with the peer to peer classification module, that one or more connection features for the second plurality of network flows resemble one or more connection features for a stored unclassified peer to peer application communication;
 responsive to determining that the one or more connection features for the second plurality of network flows resemble the one or more connection features for the stored unclassified peer to peer application communication, performing processing associated with clustering, with an unclassified peer to peer clustering module, the second plurality of network flows with the stored unclassified peer to peer application communication; and
 performing processing associated with labeling, with the peer to peer classification module, the second plurality of network flows with a second label based on its cluster;
performing processing associated with determining, with the peer to peer classification module, whether the first plurality of network flows are malicious based on the category;
performing processing associated with determining, with the peer to peer classification module, whether the second plurality of network flows are malicious based on one or more characteristics of the stored unclassified peer to peer application communication; and
in response to determining that one or more of the first plurality of network flows and the second plurality of network flows are malicious, performing processing associated with generating, with an alert module in communication with the computer, an alert and blocking at least one of the first plurality of network flows or at least one of the second plurality of network flows.

2. The method of claim 1, further comprising:
performing processing associated with identifying, with the peer to peer flow detection module in communication with the computer, and from the network flow data, a third plurality of network flows that together constitute a third peer to peer network communication within the network flow data,
performing processing associated with labeling, with the peer to peer classification module, the third plurality of network flows as an unclassified peer to peer application communication when the third plurality of network flows do not resemble the stored unclassified peer to peer application communication.

3. The method of claim 1, further comprising:
performing processing associated with receiving, with a peer to peer identifier assignment module in communication with the computer, the second label for the peer to peer application cluster, the second label further defining the peer to peer application cluster as a known peer to peer application communication.

4. The method of claim 1, wherein performing the processing associated with receiving the network flow data comprises performing processing associated with creating the network flow data from packet information.

5. The method of claim 1, wherein the network flow data is received from a router.

6. The method of claim 1, wherein performing the processing associated with identifying first the plurality of network flows within the network flow data comprises performing processing associated with comparing the network flow data to a white-listed known peer to peer application communication and ignoring the network flow data corresponding to the first plurality of network flows when it matches the white-listed known peer to peer application communication.

7. The method of claim 1, further comprising:
performing processing associated with examining the network flow data to determine at least one of:
 whether a recent DNS lookup has been performed in relation to a remote computer associated with the second plurality of network flows, and
 whether the second plurality of network flows are associated with a high activity domain;
and
performing processing associated with ignoring the second plurality of network flows when at least one of the following is true:
 a recent DNS lookup has been performed, and
 the second plurality of network flows is associated with the high activity domain.

8. The method of claim 1, wherein performing the processing associated with detecting that the first plurality of network flows matches one or more known peer to peer application communications comprises performing processing associated with:
iteratively analyzing the first plurality of network flows over a plurality of epochs; and
comparing a characteristic of the first plurality of network flows observed during one of the plurality of epochs to a characteristic of the known peer to peer application communication;
wherein each of the plurality of epochs is a different length of time from each of the remaining plurality of epochs.

9. The method of claim 8, further comprising performing processing associated with ignoring the plurality of network flows when the first plurality of network flows are older than a longest of the plurality of epochs.

10. The method of claim 1, wherein the second plurality of network flows comprise a merged first peer to peer network flow and a second peer to peer network flow related to the first peer to peer network flow.

11. The method of claim 10, wherein a P2P faux-session creation module is used to merge the first peer to peer network flow and the second peer to peer network flow.

12. The method of claim 1, wherein performing the processing associated with detecting that the first plurality of network flows matches one or more known peer to peer application communications comprises performing processing associated with generating a feature of at least one of the first plurality of network flows, the feature comprising at least one of: a payload out, a payload in, a packet out, and a packet in.

13. The method of claim 1, wherein performing the processing associated with detecting that the first plurality of network flows matches one or more known peer to peer application communications comprises:
- examining a host involved with the first plurality of network flows to determine how the host has participated in a previous peer to peer application flow;
- determining whether the first plurality of network flows is associated with at least one of a private network, a public network, and a public/private network; and
- biasing the comparison of the first plurality of network flows to the previous peer to peer application flow when the previous peer to peer application flow resembles the first plurality of network flows.

14. The method of claim 1, wherein performing the processing associated with receiving the second label for the peer to peer application cluster comprises performing processing associated with generating the second label.

15. The method of claim 1, wherein performing the processing associated with receiving the second label for the peer to peer application cluster comprises performing processing associated with receiving the second label from a user input.

16. The method of claim 1, further comprising performing processing associated with displaying, with a display, the alert.

17. The method of claim 1, wherein performing the processing associated with detecting that the first plurality of network flows matches one or more known peer to peer application communications comprises performing processing associated with generating a feature of at least one of the first plurality of network flows, the feature comprising at least one of: a transmission control protocol (TCP) flag, a user datagram protocol (UDP) flag, an internet control message protocol (ICMP) flag, a high port—high port flag, a high port—low port flag, a low port—low port flag, an internal TCP control port flag, an external TCP control port flag, an internal UDP control port flag, and an external UDP control port flag.

18. The method of claim 1, wherein performing the processing associated with detecting that the first plurality of network flows matches one or more known peer to peer application communications comprises performing processing associated with generating a feature of at least one of the first plurality of network flows, the feature comprising at least one of: an average packet exchange rate, average active flows, maximum active simultaneous flows, and maximum external hosts.

19. The method of claim 1, wherein performing the processing associated with detecting that the first plurality of network flows matches one or more known peer to peer application communications comprises performing processing associated with generating a feature of at least one of the first plurality of network flows, the feature comprising at least one of: total flows, a session duration, an average flow duration, maximum simultaneous data transfers, a one to one transfers flag, a many to one transfers flag, a percent of one to one transfers to total transfers, and a number of persistent flows.

20. The method of claim 1, wherein performing the processing associated with detecting that the first plurality of network flows matches one or more known peer to peer application communications comprises performing processing associated with generating a feature of at least one of the first plurality of network flows, the feature comprising at least one of: a percent of persistent flows, a percent of one-way flows, a percent of low traffic flows, a percent of medium traffic flows, a percent of high traffic flows.

21. The method of claim 1, wherein performing the processing associated with detecting that the first plurality of network flows matches one or more known peer to peer application communications comprises performing processing associated with generating a feature of at least one of the first plurality of network flows, the feature comprising at least one of: a possible voice flag, a possible internet radio flag, a possible audio share flag, and a possible video share flag.

22. The method of claim 1, wherein performing the processing associated with detecting that the first plurality of network flows matches one or more known peer to peer application communication comprises performing processing associated with generating a feature of at least one of the first plurality of network flows, the feature comprising at least one of: a geographic dispersion, and an NXDOMAIN response.

* * * * *